(12) United States Patent
Huang et al.

(10) Patent No.: US 11,395,230 B2
(45) Date of Patent: Jul. 19, 2022

(54) COMMUNICATION APPARATUS AND COMMUNICATION METHOD

(71) Applicant: Panasonic Intellectual Property Corporation of America, Torrance, CA (US)

(72) Inventors: Lei Huang, Singapore (SG); Yoshio Urabe, Nara (JP); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/768,354

(22) PCT Filed: Dec. 13, 2018

(86) PCT No.: PCT/JP2018/045806
§ 371 (c)(1),
(2) Date: May 29, 2020

(87) PCT Pub. No.: WO2019/117233
PCT Pub. Date: Jun. 20, 2019

(65) Prior Publication Data
US 2020/0367170 A1 Nov. 19, 2020

Related U.S. Application Data

(60) Provisional application No. 62/598,942, filed on Dec. 14, 2017.

(30) Foreign Application Priority Data

Feb. 27, 2018 (JP) .............................. JP2018-032821

(51) Int. Cl.
*H04W 52/02* (2009.01)
*H04W 76/11* (2018.01)
(Continued)

(52) U.S. Cl.
CPC ......... *H04W 52/0235* (2013.01); *H04W 8/24* (2013.01); *H04W 52/0216* (2013.01); *H04W 76/11* (2018.02); *H04W 84/12* (2013.01)

(58) Field of Classification Search
CPC ... H04W 52/0235; H04W 76/11; H04W 8/24; H04W 52/0216; H04W 84/12
See application file for complete search history.

(56) References Cited

U.S. PATENT DOCUMENTS

2014/0211678 A1 7/2014 Jafarian et al.
2014/0248914 A1* 9/2014 Aoyagi ................. H04W 48/08
455/458

(Continued)

OTHER PUBLICATIONS

Asterjadhi et al. , "WUR frame format—follow up", doc. IEEE 802.11-17/1645r3, Nov. 2017, XP055617697 (Year: 2017).*

(Continued)

*Primary Examiner* — Mohammad S Anwar
(74) *Attorney, Agent, or Firm* — Seed IP Law Group LLP

(57) ABSTRACT

A transmission apparatus of the present disclosure comprises a signal generator which, in operation, generates a transmission signal that includes a data field containing a WUR (Wake Up Radio) frame; wherein an address field of the WUR frame contains a first identifier if the WUR frame is unicast WUR Wake Up frame, or a second identifier if the WUR frame is multicast WUR Wake Up frame, or a third identifier if the WUR frame is broadcast WUR Wake Up frame; wherein the value ranges of the first identifier, the second identifier and the third identifier are mutually exclusive; and a transmitter which, in operation, transmits the generated transmission signal.

20 Claims, 33 Drawing Sheets

| WUR frame type | Address field |
|---|---|
| Unicast WUR Wake Up | Wake Up ID |
| Multicast WUR Wake Up | Group ID |
| Broadcast WUR Wake Up or WUR Beacon | Transmit ID |
| WUR Vendor Specific | OUI1 |

(51) Int. Cl.
*H04W 8/24* (2009.01)
*H04W 84/12* (2009.01)

(56) References Cited

U.S. PATENT DOCUMENTS

| | | | |
|---|---|---|---|
| 2016/0057692 A1* | 2/2016 | Geng | H04W 48/02 370/329 |
| 2017/0111858 A1* | 4/2017 | Azizi | H04L 27/261 |
| 2018/0132176 A1* | 5/2018 | Abraham | H04L 43/087 |

OTHER PUBLICATIONS

Asterjadhi et al., WUR frame format—Follow up, IEEE 802.11-17/1645r1, Nov. 2017 (Year: 2017).*
Asterjadhi et al., "WUR frame format—Follow up," IEEE 802.11-17/1645r3, Qualcomm Inc., Nov. 2017, 15 pages.
Huang, "Specification Framework for TGba," IEEE 802.11-17/0575r7 (IEEE802.11-15/0132r157), Intel, Nov. 29, 2017, 13 pages.
International Search Report, dated Feb. 19, 2019, for corresponding International Application No. PCT/JP2018/045806, 1 page.
Kim et al., "Address structure in unicast wake-up frame," IEEE 802.11-17/0977r4, LG Electronics, Jul. 9, 2017, 12 pages.
Asterjadhi et al., "Considerations on WUR frame format," doc.: IEEE 802.11-17/1004r0, Jul. 4, 2017, 15 pages.
Astrin, "TG6 Draft," IEEE P802. 15-10-0245-00-0006, IEEE P802.15 Working Group for Wireless Personal Area Networks (WPANs), Apr. 18, 2010, 209 pages.
Extended European Search Report dated Jan. 29, 2021, for the corresponding European Patent Application No. 18887318.6, 10 pages.

\* cited by examiner

| Action Type field value | Meaning |
|---|---|
| 0 | Enter WUR Mode Request |
| 1 | Enter WUR Mode Response |
| 2 | Enter WUR Mode Suspend Request |
| 3 | Enter WUR Mode Suspend Response |
| 4 | Enter WUR Mode Suspend |
| 5 | Enter WUR Mode |
| 6 | Update WUR Parameters |

Figure 7

| Type | Type description |
|------|------------------|
| 0 | WUR Beacon |
| 1 | WUR Wake Up |
| 2 | WUR Vendor Specific |

Figure 12

| WUR frame type | Address field |
|---|---|
| Unicast WUR Wake Up | Wake Up ID |
| Multicast WUR Wake Up | Group ID |
| Broadcast WUR Wake Up or WUR Beacon | Transmit ID |
| WUR Vendor Specific | OUI1 |

Figure 13

| WUR frame type | Address field |
|---|---|
| Unicast WUR Wake Up | Wake Up ID |
| Multicast WUR Wake Up | Converted Group ID |
| Broadcast WUR Wake Up or WUR Beacon | Converted Transmit ID |
| WUR Vendor Specific | OUI1 |

Figure 14

| Converted Transmit ID | Converted Group ID | Wake Up ID |
|---|---|---|
| 0x000-0x0FF | 0x100-0x1FF | 0x200-0xFFF |

Figure 15A

| WUR frame type | Address field |
|---|---|
| Unicast WUR Wake Up | Converted Wake Up ID |
| Multicast WUR Wake Up | Converted Group ID |
| Broadcast WUR Wake Up or WUR Beacon | Converted Transmit ID |
| WUR Vendor Specific | OUI1 |

Figure 16

| | Converted Transmit ID | Reserved | Converted Group ID | Reserved | Converted Wake Up ID |
|---|---|---|---|---|---|
| | 0x000-0x0FF | | 0x400-0x4FF | | 0x800-0xFFF |

| | B11 (MSB) | B10 | B9 | B8 | B7-B0 |
|---|---|---|---|---|---|
| Converted Wake Up ID | 1 | Wake Up ID | | | |
| Reserved | 0 | 1 | 1 | 1 | any |
| Reserved | 0 | 1 | 0 | 1 | any |
| Converted Group ID | 0 | 1 | 0 | 0 | Group ID |
| Reserved | 0 | 0 | 1 | any | |
| Reserved | 0 | 0 | 0 | 1 | any |
| Converted Transmit ID | 0 | 0 | 0 | 0 | Transmit ID |

Figure 17A

| Special ID | Wake Up ID | Group ID | Transmit ID | Wake Up ID |
|---|---|---|---|---|
| 0x000 | 0x001-0x3FF | 0x400-0x4FF | 0x500 | 0x501-0xFFF |

Figure 18A

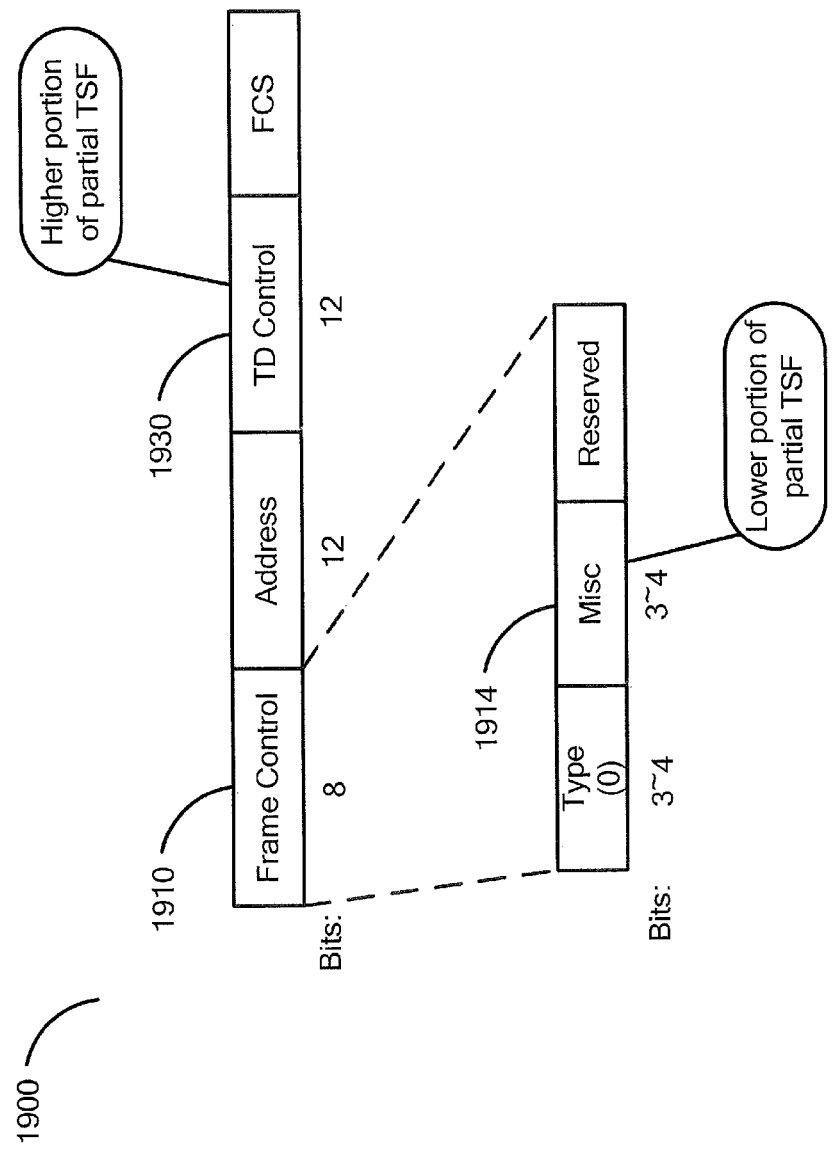

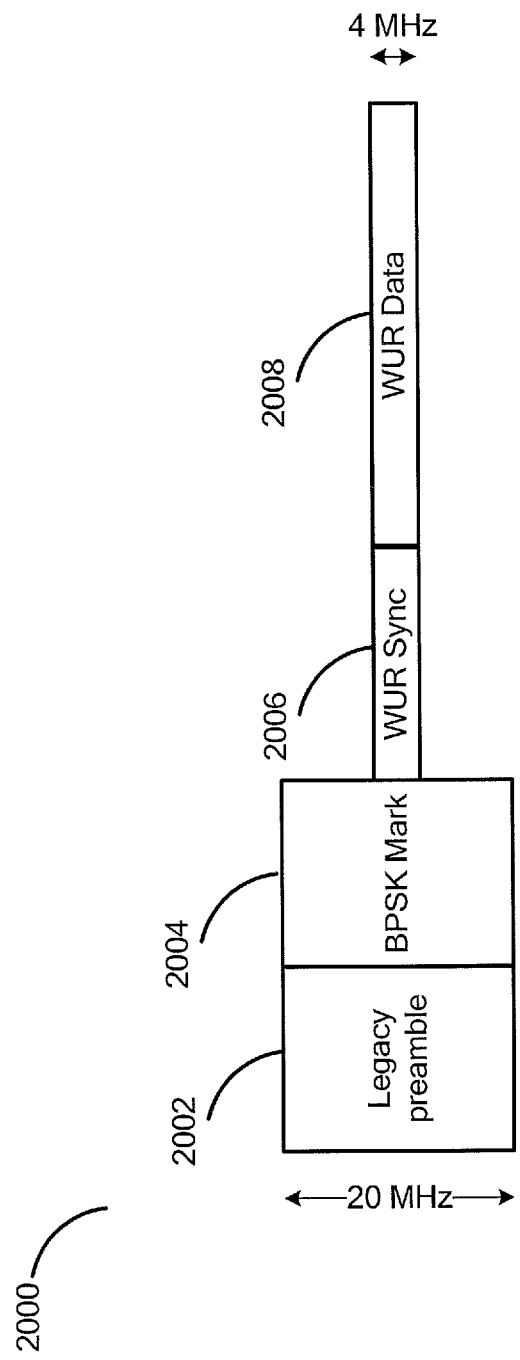

COMMUNICATION APPARATUS AND COMMUNICATION METHOD

TECHNICAL FIELD

The present disclosure is generally related to a communication apparatus and a communication method.

BACKGROUND ART

The IEEE (Institute of Electrical and Electronics Engineers) 802.11 Working Group is defining a PHY (physical) layer specification and modifications on MAC (Medium Access Control) layer specification that enable operation of a WUR (Wake Up Radio) apparatus. The WUR apparatus is a companion radio apparatus to a PCR (Primary Connectivity Radio) apparatus, e.g., IEEE 802.11a/g/n/ac/ax radio apparatus. The WUR apparatus comprises a WURx (Wake Up Receiver) which is capable of receiving WUR frames. The PCR apparatus included in a wireless communication device is used for user data communication with the access point (AP) with which the device is associated; while the WUR apparatus included in the device is not used for user data communication. For a wireless communication device operating in WUR Mode, when the PCR apparatus of the device is in doze state, the WURx of the device follows the duty cycle schedules negotiated between the device and the AP. Once the WURx of the device receives a WUR Wake Up frame, the PCR apparatus of the device transits to awake state.

CITATION LIST

Non Patent Literature

[NPL 1]
IEEE 802.11-17/0575r7 (IEEE802.11-15/0132r157), Specification Framework for TGba, November 2017
[NPL 2]
IEEE 802.11-17/0977r4, Address structure in unicast wake-up frame, July 2017
[NPL 3]
IEEE 802.11-17/1645r3, WUR frame format-follow up, November 2017

SUMMARY OF INVENTION

Technical Problem

Studies are underway on how a wireless communication device is able to perform WUR mode operation in an efficient manner.

Solution to Problem

One non-limiting and exemplary embodiment of the present disclosure facilitates performing WUR mode operation in an efficient manner.

In one general aspect, the techniques disclosed here feature: a transmission apparatus comprising a signal generator which, in operation, generates a transmission signal that includes a data field containing a WUR frame; wherein an address field of the WUR frame contains a first identifier if the WUR frame is unicast WUR Wake Up frame, or a second identifier if the WUR frame is multicast WUR Wake Up frame, or a third identifier if the WUR frame is broadcast WUR Wake Up frame; wherein the value ranges of the first identifier, the second identifier and the third identifier are mutually exclusive; and a transmitter which, in operation, transmits the generated transmission signal.

It should be noted that general or specific embodiments may be implemented as a system, a method, an integrated circuit, a computer program, a storage medium, or any selective combination thereof.

Advantageous Effects of Invention

By taking advantage of the communication apparatus and the communication method described in the present disclosure, a wireless communication device is able to perform WUR mode operation in an efficient manner.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 7 is a diagram illustrating an example definition of Action Type field of WUR Mode element according to the present disclosure.

FIG. 12 is a diagram illustrating an example definition of the Type field of the WUR frame according to the present disclosure.

FIG. 13 is a diagram illustrating an example definition of the Address field of the WUR frame.

FIG. 14 is a diagram illustrating an example definition of the Address field of the WUR frame according to a first embodiment of the present disclosure.

FIG. 15A is a diagram illustrating an example addressing space of the Address field of the WUR frame according to the first embodiment of the present disclosure.

FIG. 16 is a diagram illustrating an example definition of the Address field of the WUR frame according to a second embodiment of the present disclosure.

FIG. 17A is a diagram illustrating an example addressing space of the Address field of the WUR frame according to the second embodiment of the present disclosure.

FIG. 18A is a diagram illustrating an example addressing space of the Address field of the WUR frame according to a third embodiment of the present disclosure.

FIG. 19 is a diagram illustrating an example format of WUR Beacon frame according to the present disclosure.

FIG. 20 is a diagram illustrating an example format of non-FDMA (Frequency Division Multiple Access) WUR PPDU (Physical Layer Protocol Data Unit) according to the present disclosure.

DESCRIPTION OF EMBODIMENTS

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitely described herein.

In any wireless communication system, a wide variety of devices may be a part of the wireless network, each device differing in terms of traffic needs, device capabilities, power supply types and so on. Some class of devices may have less bandwidth requirements and also less stringent QoS (Quality of Service) requirements but may be relatively more concerned about power consumption (e.g., mobile phones). Another class of devices may have low bandwidth requirements as well as very low duty cycles but may be very sensitive to power consumption due to extremely small batteries or extremely long life expectancy (e.g., sensors for remote sensing).

In many wireless communication systems, there will be one or more central controllers which will determine the wireless network coverage area, the wireless frequency channels, the device admission policy, coordination with other neighboring wireless networks etc. and usually also act as a gateway to the backend infrastructure network. Examples of the central controllers are base stations or eNBs in cellular wireless networks or APs in WLANs (Wireless Local Area Networks).

Even though the techniques described in the present disclosure may apply to many wireless communication systems, for the sake of example, the rest of the descriptions in this disclosure are described in terms of an IEEE 802.11 based WLAN system and its associated terminologies. This should not be taken as limiting the present disclosure with regard to alternative wireless communication systems. In IEEE 802.11 based WLANs, majority of networks operate in infrastructure mode, i.e., all or most of the traffic in the network need to go through the AP. As such, any STA (station) wishing to join the WLAN must first negotiate the network membership with the AP through a process called association and authentication.

Figure 1:
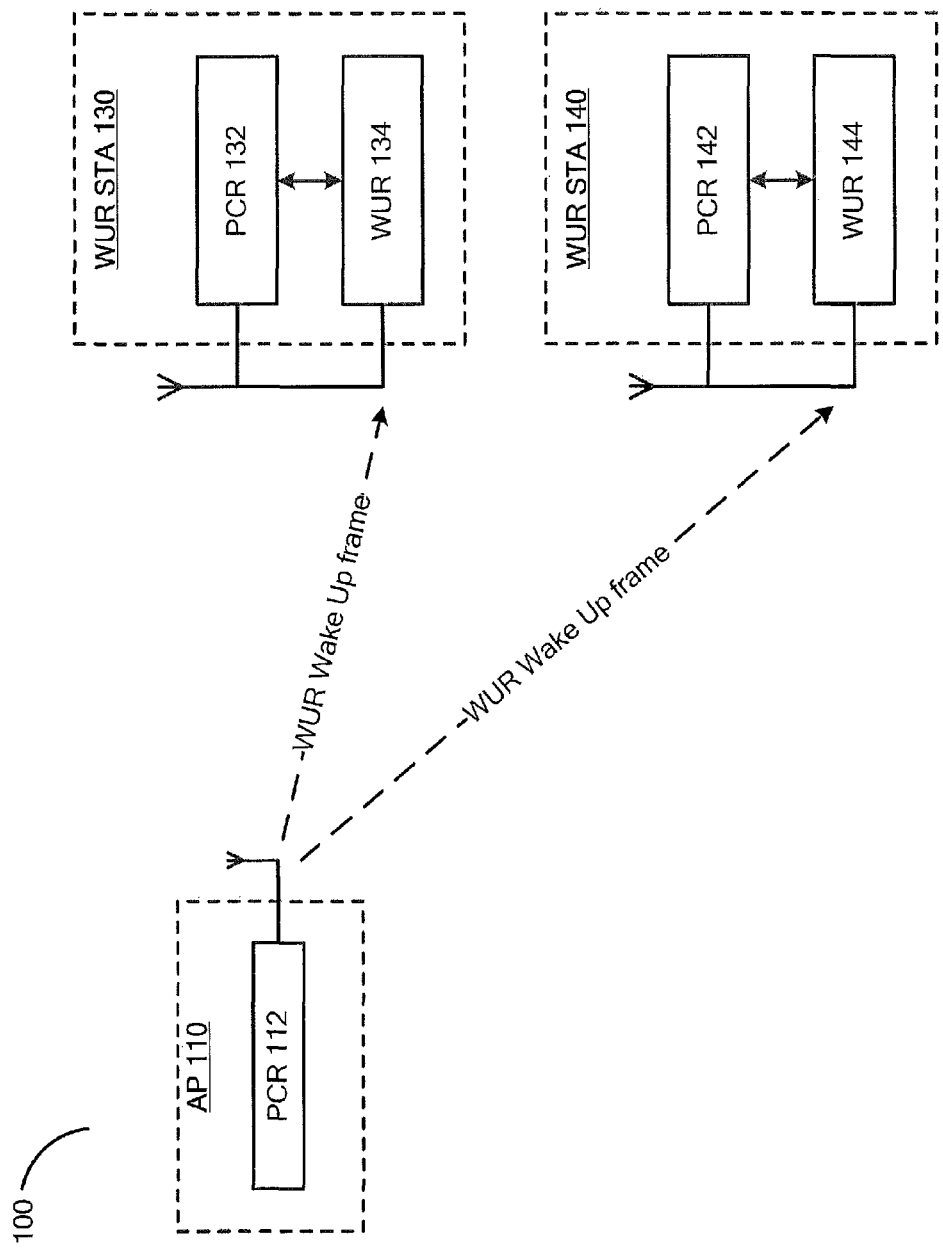
FIG. 1 is a diagram illustrating an example wireless network.

FIG. 1 illustrates an example wireless network 100 including an AP 110 and a plurality of STAs associated with the AP 110. The plurality of STAs form a BSS (Basic Service Set) of the AP 110. The AP 110 includes a PCR apparatus (hereinafter stated simply as "PCR") 112. The STA 130 represents a device class that may have less bandwidth requirements and also less stringent QoS requirements but may be relatively more concerned about power consumption. The STA 140 represents another class of devices that may have low bandwidth requirements but may be very sensitive to power consumption. In order to maximise energy efficiency, the STA 130 is equipped with a WUR apparatus 134 (hereinafter stated simply as "WUR") in addition to a PCR 132 and the STA 140 is equipped with a WUR 144 in addition to a PCR 142. Both the STA 130 and the STA 140 are termed as WUR STAs thereafter.

According to the present disclosure, the PCR of a WUR STA can operate in either of the two power management modes: active mode and PS (power save) mode. For the PCR of the WUR STA operating in PS mode, it is in awake state when it is able to receive DL (downlink) traffic or transmit UL (uplink) traffic; and it is in doze state when it is not able to receive DL traffic and transmit UL traffic. For the PCR of a WUR STA operating in active mode, it is always in awake state.

According to the present disclosure, the WUR apparatus of a WUR STA comprises a WURx which is capable of receiving WUR frames. The WURx of the WUR STA can be in either of the two states: WURx Awake or WURx Doze. The WURx of the WUR STA is in WURx Awake state when it is able to receive WUR frames. The WURx of the WUR STA is in WURx Doze state when it is not able to receive WUR frames.

According to the present disclosure, a WUR STA can operates in WUR Mode Suspend or WUR Mode. When the WUR STA operates in WUR Mode, its WURx shall be in WURx Awake state during the on duration of the WUR duty cycle operation negotiated between the AP 110 and the WUR STA if the PCR of the WUR STA is in doze state; and its WURx may be in WURx Doze state after the WUR STA uses its PCR to complete a successful frame exchange with the AP 110, which informs the AP 110 that the PCR of the WUR STA is awake state. When the WUR STA operates in WUR Mode Suspend, its WURx may be in WURx Doze state; and the WUR parameters negotiated between the AP 110 and the WUR STA are maintained by the WUR STA and the AP 110.

Figure 2:
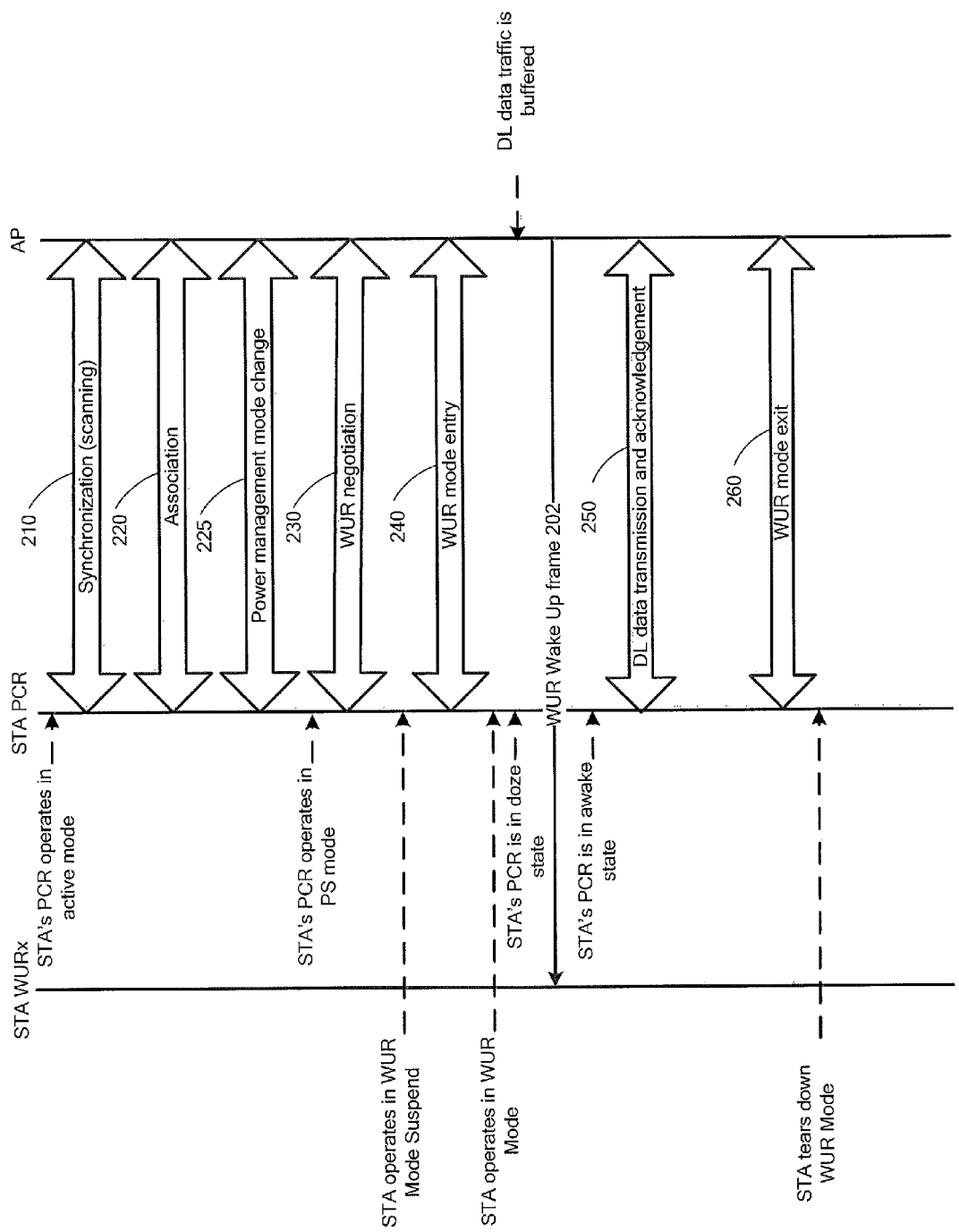
FIG. 2 is a diagram illustrating an example of WUR mode operation related MAC procedures according to the present disclosure.

FIG. 2 illustrates an example of WUR mode operation related MAC procedures operated by a WUR STA and the AP 110 according to the present disclosure. Before the WUR STA is associated with the AP 110, its PCR is in active mode. The STA initiates a synchronization procedure 210 to acquire synchronization with the AP 110 via passive or active scanning. During the synchronization procedure 210, if active scanning is performed, the STA sends a Probe Request frame to the AP 110 via its PCR. The Probe Request frame includes a WUR Capabilities element (see FIG. 3A) advertising WUR capabilities of the STA. The AP 110 responds with a Probe Response frame. The Probe Response frame includes a WUR Capabilities element advertising WUR capabilities of the AP 110 and a WUR Operation element (see FIG. 3B) announcing WUR operation parameters. If passive scanning is performed, the STA receives a Beacon frame from the AP 110 via its PCR. The Beacon frame contains a WUR Capabilities element which advertises WUR capabilities of the AP 110 and a WUR Operation element announcing WUR operation parameters. The formats of the Probe Request frame, the Probe Response frame and the Beacon frame are defined in the IEEE Std 802.11™-2016.

Figure 3A:
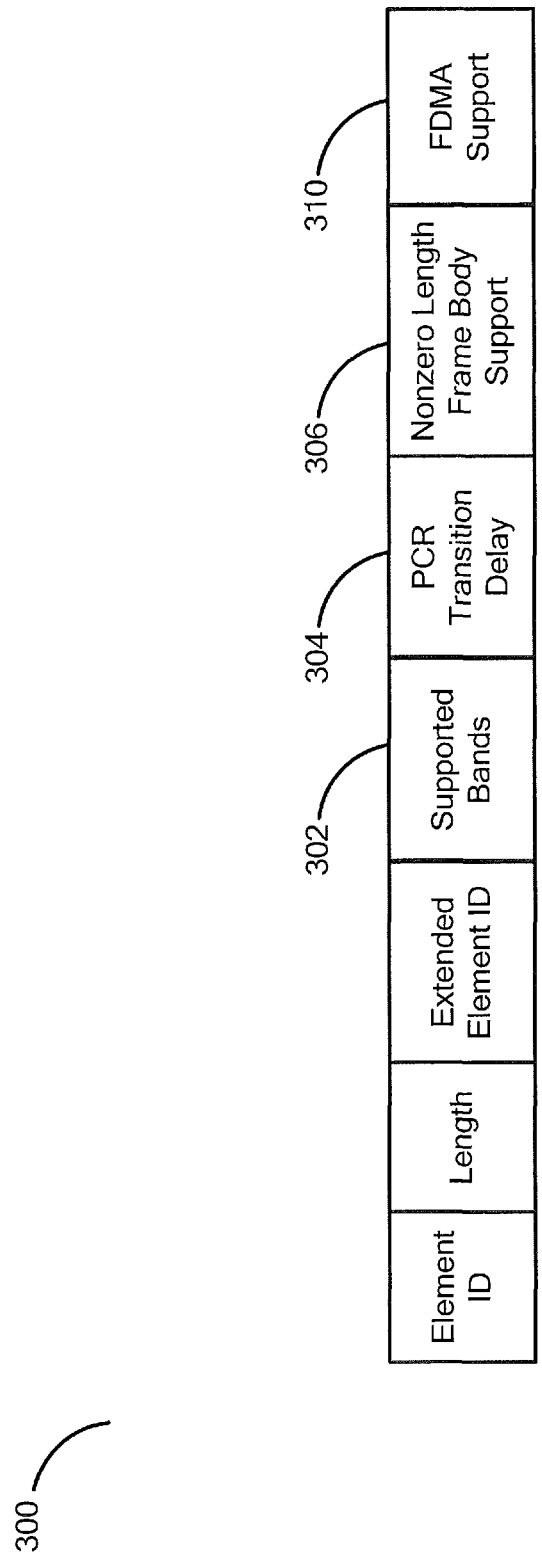
FIG. 3A is a diagram illustrating an example format of WUR Capabilities element according to the present disclosure.

FIG. 3A illustrates an example format of WUR Capabilities element 300 according to the present disclosure. The WUR Capabilities element 300 indicates WUR capabilities of the WUR STA or the AP 110 transmitting the element 300 and comprises a Supported Bands field 302, a PCR Transition Delay field 304, a Nonzero Length Frame Body Support field 306 and a FDMA Support field 310. The Supported Bands field 302 indicates supported bands for WUR operating channel. The PCR Transition Delay field 304 indicates PCR transition delay from doze state to awake state of the WUR STA transmitting the element 300 after receiving a WUR Wake Up frame. The Nonzero Length Frame Body Support field 306 indicates supportability of non-zero length frame body of WUR frame (see FIG. 11). The Supported Bands field 302, the PCR Transition Delay field 304 and the Nonzero Length Frame Body Support field 306 are reserved when the element 300 is transmitted by the AP 110. The FDMA Support field 310 indicates supportability of transmitting FDMA WUR PPDU (see FIG. 19) in which two or more WUR frames are multiplexed in frequency domain if the element 300 is transmitted by the AP 110 or supportability of receiving FDMA WUR PPDU if the element 300 is transmitted by a WUR STA.

Figure 3B:
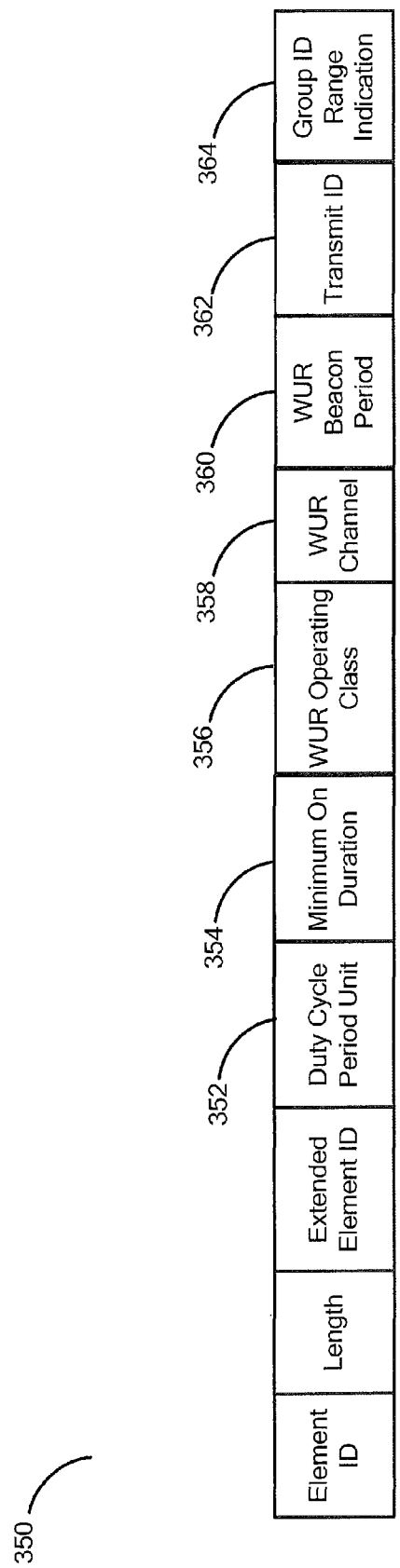
FIG. 3B is a diagram illustrating an example format of WUR Operation element according to the present disclosure.

FIG. 3B illustrates an example format of WUR Operation element 350 according to the present disclosure. The WUR Operation element 350 contains WUR parameters which are controlled by an AP and are common to all WUR STAs in the BSS of the AP. The WUR Operation element 350 comprises a Duty Cycle Period Unit field 352, a Minimum On Duration field 354, a WUR Operating Class field 356, a WUR Channel field 358, a WUR Beacon Period field 360, a Transmit ID field 362 and a Group ID Range Indication field 364. The Duty Cycle Period Unit field 352 indicates the basic unit of the period of the WUR duty cycle operation, which is a multiple of time unit (1024 us) defined in the IEEE Std 802.11™-2016 for easy of implementation. The Minimum On Duration field 354 indicates a minimum value of the on duration of the WUR duty cycle operation, which is a multiple of time unit (1024 us) defined in the IEEE Std 802.11™-2016 for easy of implementation. The WUR Operating Class field 356 indicates the operating class in use for transmission of WUR frame from the AP 110 to the intended STA. The WUR Channel field 358 indicates the channel in use for transmission of WUR frame from the AP 110 to the intended STA. The WUR Beacon Period field 360 indicates the period of WUR Beacon frame. The Transmit ID field 362 indicates the Transmit ID of the AP transmitting the WUR Operation element 350. An AP may assign the Transmit ID value randomly or according to a predetermined rule. For example, the AP may determine the Transmit ID value by extracting a predetermined number of bits from the MAC address or the BSSID (Basic Service Set Identifier) of the AP. The Transmit ID field 362 is omitted when the Transmit ID value of the AP can be uniquely derived from other parameters known by the associated WUR STAs (e.g., the MAC address or the BSSID of the AP). The Group ID Range Indication field 364 indicates the value range of Group ID.

After the WUR STA gets synchronized with the AP 110 via the synchronization procedure 220, it may initiate an association procedure 220 with the AP 110. During the association procedure 220, the STA sends an Association Request frame or a Reassociation Request frame to the AP 110, which includes a WUR Capabilities element for advertising WUR capabilities of the STA. The AP 110 responds with an Association Response frame or a Reassociation Response frame, which includes a WUR Capabilities element for advertising WUR capabilities of the AP 110 and a WUR Operation element for announcing WUR operation parameters. The formats of the Association Request frame, the Association Response frame, the Reassociation Request frame and the Reassociation Response frame are defined in the IEEE Std 802.11™-2016.

The STA may initiate a power management mode change procedure 225 for changing its PCR's power management mode to PS mode after it is associated with the AP 110 via the association procedure 220 with the AP 110. During the power management mode change procedure 225, the STA may transmit a QoS Null frame via its PCR with the Power Management subfield set to 1 to the AP 110; and the AP 110 will respond with an Ack frame. After receiving the Ack frame, the STA's PCR transits to operate in PS mode. After that, the STA may initiate a WUR negotiation procedure 230 with the AP 110 to negotiate WUR parameters. The formats of the QoS Null frame and Ack frame are defined in the IEEE Std 802.11™-2016.

Figure 4:
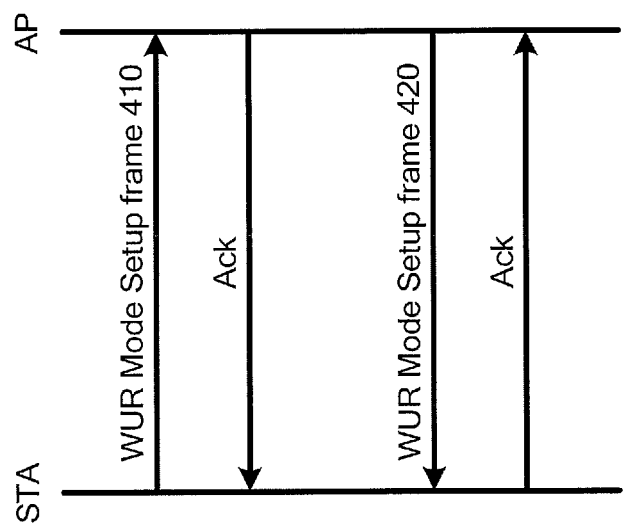
FIG. 4 is a diagram illustrating an example WUR negotiation procedure according to the present disclosure.

FIG. 4 illustrates an example WUR negotiation procedure according to the present disclosure. The WUR STA transmits a WUR Mode Setup frame 410 via its PCR to the AP 110. The WUR Mode Setup frame is a WUR Action frame (see FIG. 5) with the WUR Action field set to "WUR Mode Setup". The WUR Mode Setup frame 410 contains a WUR Mode element (see FIG. 6) in which the Action Type field is set to "Enter WUR Mode Suspend Request" (see FIG. 7) and the WUR Parameters field (see FIG. 8A) contains the WUR parameters preferred by the STA. The AP 110 responds with an Ack frame upon succesful receipt of the WUR Mode Setup frame 410. After that, the AP 110 transmits a WUR Mode Setup frame 420 to the STA. The WUR Mode Setup frame 420 contains a WUR Mode element in which the Action Type field is set to "Enter WUR Mode Suspend Response" and the WUR Mode Response Status field sets to "Accept" or "Denied". If the WUR Mode Response Status field of the WUR Mode element in the WUR Mode Setup frame 420 is set to "Accept", the WUR Parameters field of the same WUR Mode element (see FIG. 8B, 8C or 8D) contains the WUR parameters determined by the AP 110. If the WUR Mode Response Status field sets to "Denied", the WUR Parameters field is not present. The STA responds with an Ack frame via its PCR upon succesful receipt of the WUR Mode Setup frame 420.

Figure 9:
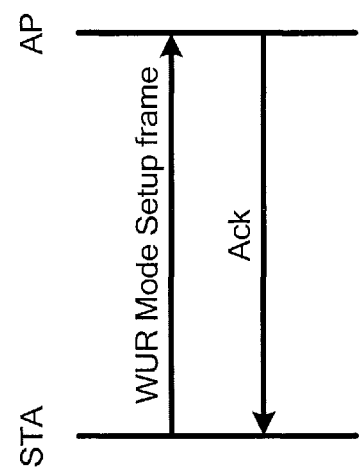
FIG. 9 is a diagram illustrating an example WUR mode entry procedure according to the present disclosure.

If the WUR negotiation procedure 230 is successfully completed (i.e., the WUR Mode Response Status field of the WUR Mode element in the WUR Mode Setup frame 420 is set to "Accept"), the WUR STA enters WUR Mode Suspend. Then the WUR STA may initiate a WUR mode entry procedure 240 with the AP 110 to switch to WUR Mode from WUR Mode Suspend for better power save. FIG. 9 illustrates an example WUR mode entry procedure 240 according to the present disclosure. The WUR STA transmits a WUR Mode Setup frame via its PCR to the AP 110. The WUR Mode Setup frame contains a WUR Mode element in which the Action Type field is set to "Enter WUR Mode" and the WUR Parameters field is not present. The AP 110 responds with an Ack frame upon succesful receipt of the WUR Mode Setup frame. After receiving the Ack frame, the STA operates in WUR Mode according to the WUR parameters negotiated between the AP 110 and the STA during the WUR negotiation procedure 230. In more details, the WURx of the STA operating in WUR Mode follows the duty cycle schedules negotiated between the AP 110 and the STA if the PCR of the STA is in doze state.

Alternatively, instead of separate WUR negotiation procedure 230 and WUR mode entry procedure 240, the STA may initiate an integrated WUR negotiation and WUR mode entry procedure with the AP 110 for requesting to enter WUR Mode. During the integrated WUR negotiation and WUR mode entry procedure, the STA transmits a WUR Mode Setup frame via its PCR to the AP 110. The WUR Mode Setup frame contains a WUR Mode element in which the Action Type field is set to "Enter WUR Mode Request" and the WUR Parameters field contains the WUR parameters preferred by the STA. The AP 110 responds with an Ack frame upon succesful receipt of the WUR Mode Setup frame. After that, the AP 110 transmits a WUR Mode Setup frame to the STA. The WUR Mode Setup frame contains a WUR Mode element in which the Action Type field is set to "Enter WUR Mode Response" and the WUR Mode Response Status field is set to "Accept" or "Denied". If the WUR Mode Response Status field is set to "Accept", the WUR Parameters field contains the WUR parameters determined by the AP 110. If the WUR Mode Response Status field sets to "Denied", the WUR Parameters field is not present. The STA responds with an Ack frame via its PCR upon succesful receipt of the WUR Mode Setup frame.

According to the present disclosure, if the PCR of the WUR STA operating in WUR Mode is in doze state, its WURx shall be in WURx Awake state regularly to attempt reception of WUR Beacon frame that is transmitted by the AP 110 periodically in order to keep synchronized with the AP 110.

According to the present disclosure, if the PCR of the WUR STA operating in WUR Mode is in doze state, when its WURx receives a WUR Wake Up frame from the AP 110, its PCR transits to awake state as shown in FIG. 2, and then initiates a DL data transmission and acknowledgement procedure 250 with the AP 110. During the DL data transmission and acknowledgement procedure 250, it may transmit a PS-Poll frame to the AP 110 via its PCR to retrieve buffered traffic and acknowledge successful receipt of the WUR Wake Up frame. The AP 110 responds to the PS-Poll frame with a buffered QoS Data frame or an Ack frame followed in a separate TXOP (transmit opportunity) by a buffered QoS Data frame at the head of transmit queue. If there is more buffered traffic for the STA, the More Data field in the delivered QoS Data frame is set to 1. Otherwise, the More Data field in the delivered QoS Data frame is set to 0. The STA responds with an acknowledgement frame via its PCR for acknowledging successful receipt of the QoS Data frame. The acknoweldgement frame is either an Ack frame or a BlockAck frame. The formats of the QoS Data frame and the BlockAck frame are defined in the IEEE Std 802.11™-2016.

Figure 10:
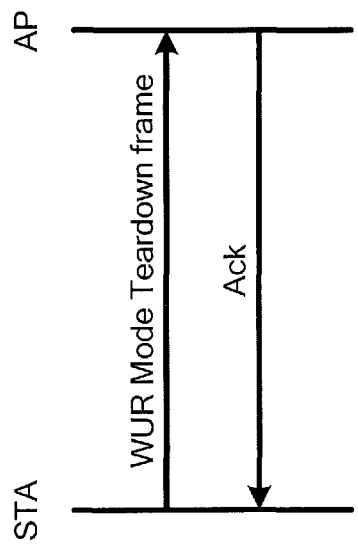
FIG. 10 is a diagram illustrating an example WUR exit procedure according to the present disclosure.

According to the present disclosure, when the WUR STA intends to tear down WUR Mode, it initiates a WUR mode exit procedure 260 with the AP 110. FIG. 10 illustrates an example WUR mode exit procedure 260 according to the present disclosure. The STA transmits a WUR Mode Teardown frame via its PCR to the AP 110. The WUR Mode Teardown frame is a WUR Action frame (see FIG. 5) in which the WUR Action field is set to "WUR Mode Teardown" and the WUR Mode element is not present. The AP 110 responds with an Ack frame upon successful receipt of the WUR Mode Teardown frame. After receiving the Ack frame, the STA tears down WUR Mode.

An Example Format of WUR Action Frame

Figure 5:
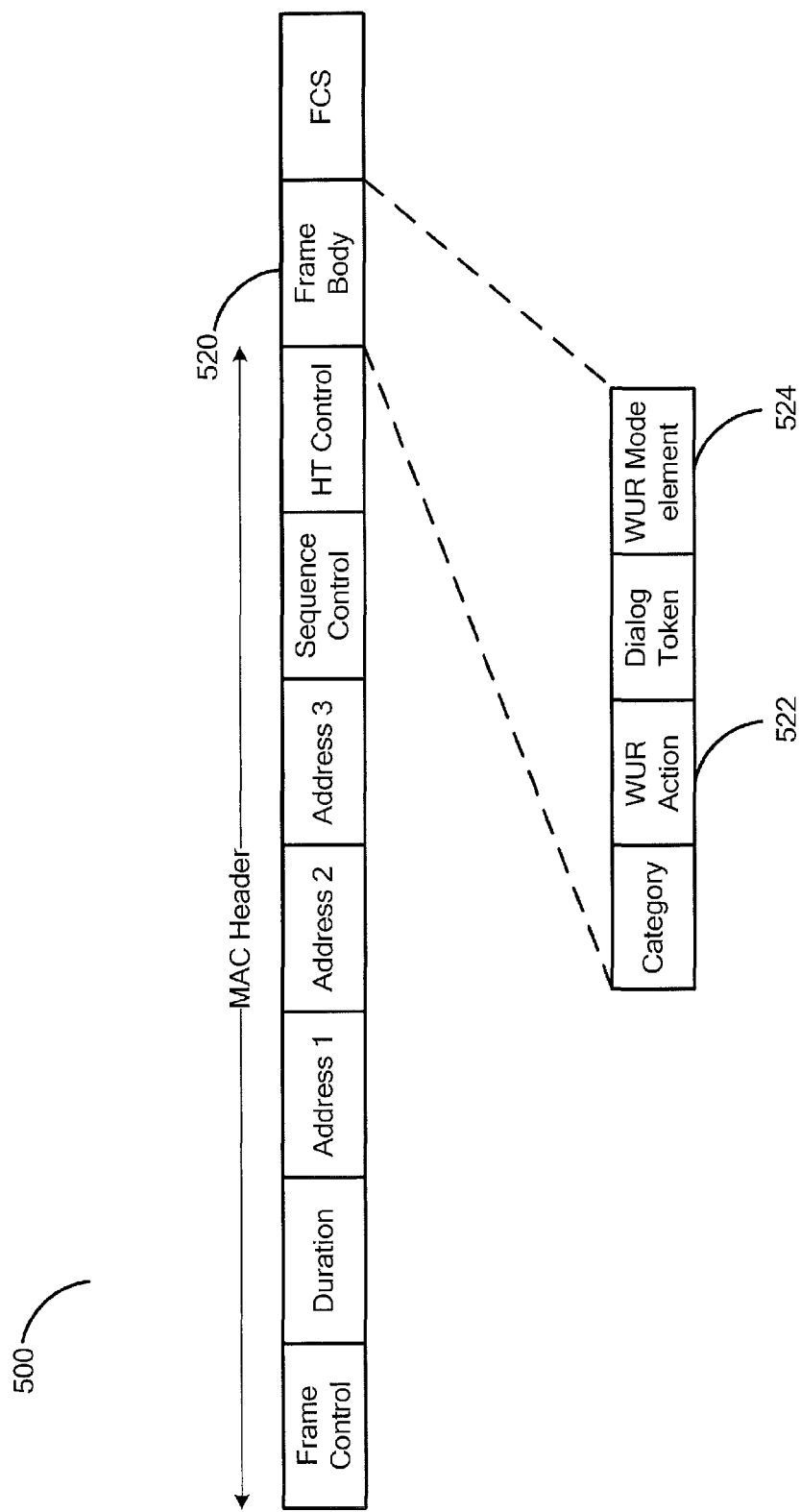
FIG. 5 is a diagram illustrating an example format of WUR Action frame according to the present disclosure.

FIG. 5 illustrates an example format of WUR Action frame 500 according to the present disclosure. The WUR Action frame 500 comprises a MAC Header portion and a Frame Body portion 520. The Frame Body portion 520 comprises a WUR Action field 522 and a WUR Mode element 524. The WUR Action field 522 indicates the type of the WUR Action frame 500, e.g., WUR Mode Setup or WUR Mode Teardown.

Figure 6:
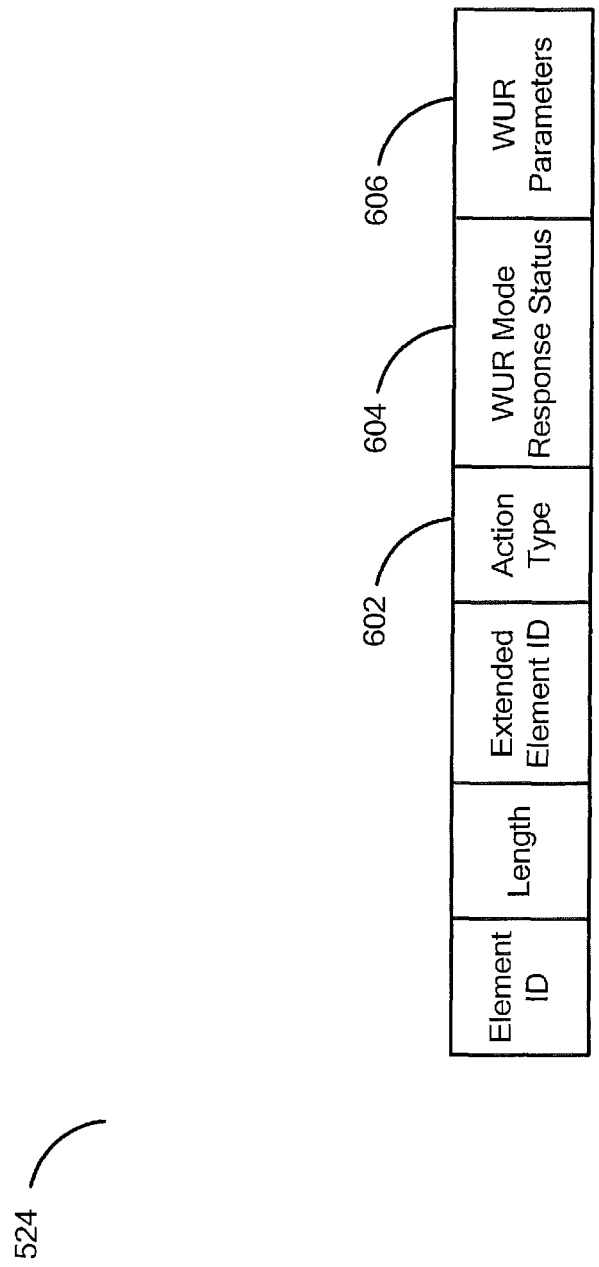
FIG. 6 is a diagram illustrating an example format of WUR Mode element according to the present disclosure.

FIG. 6 illustrates an example format of WUR Mode element 524 according to the present disclosure. The WUR Mode element 524 comprises an Action Type field 602, a WUR Mode Response Status field 604 and a WUR Parameters field 606. The Action Type field 602 is defined in FIG. 7 and indicates the action taken by the WUR Action frame 500. The WUR Mode Response Status field 604 indicates whether the request for entering WUR Mode Suspend or WUR Mode is accepted or denied. The WUR Parameters field 606 contains user-specific WUR parameters either preferred by a WUR STA or determined by the AP 110.

Figure 8A:
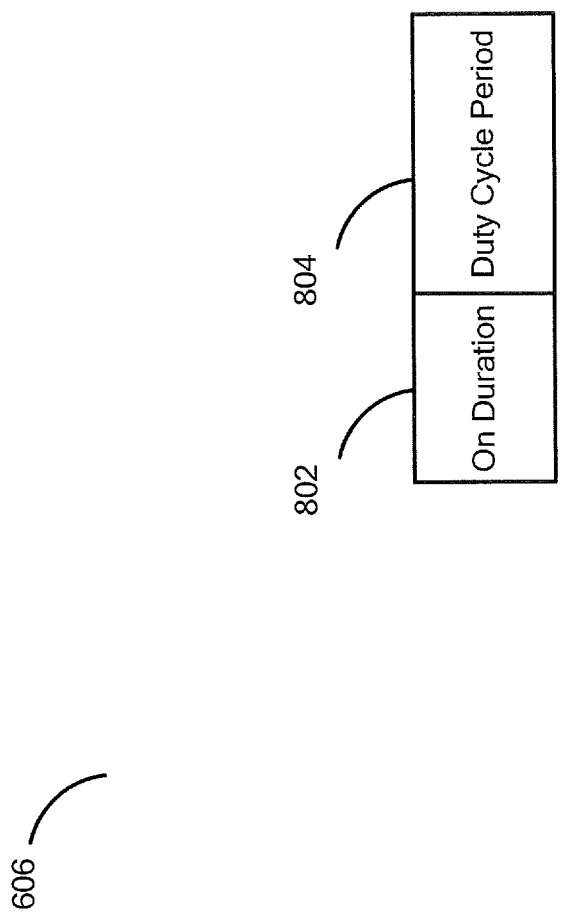
FIG. 8A is a diagram illustrating an example format of WUR Parameters field of WUR Mode element transmitted by a WUR STA according to the present disclosure.

FIG. 8A illustrates an example format of WUR Parameters field 606 of the WUR Mode element 524 transmitted by a WUR STA according to the present disclosure. The WUR Parameters field 606 of the WUR Mode element 524 transmitted by the STA comprises an On Duration field 802 and a Duty Cycle Period field 804. The On Duration field 802 indicates the preferred on duration that the STA's WURx will be in WURx Awake state for each WUR duty cycle schedule. The preferred on duration is a multiple of time unit (1024 us) defined in the IEEE Std 802.11™-2016 for easy of implementation and shall be larger than or equal to the minimum on duration indicated by the Minimum On Duration field in the most recently received WUR Operation element from the AP 110. The Duty Cycle Period field 804 indicates the preferred elapsed time between the start times of two successive WUR duty cycle schedules. The Duty Cycle Period field 804 is based on the unit indicated by the Duty Cycle Period Unit field in the most recently received WUR Operation element from the AP 110.

Figure 8B:
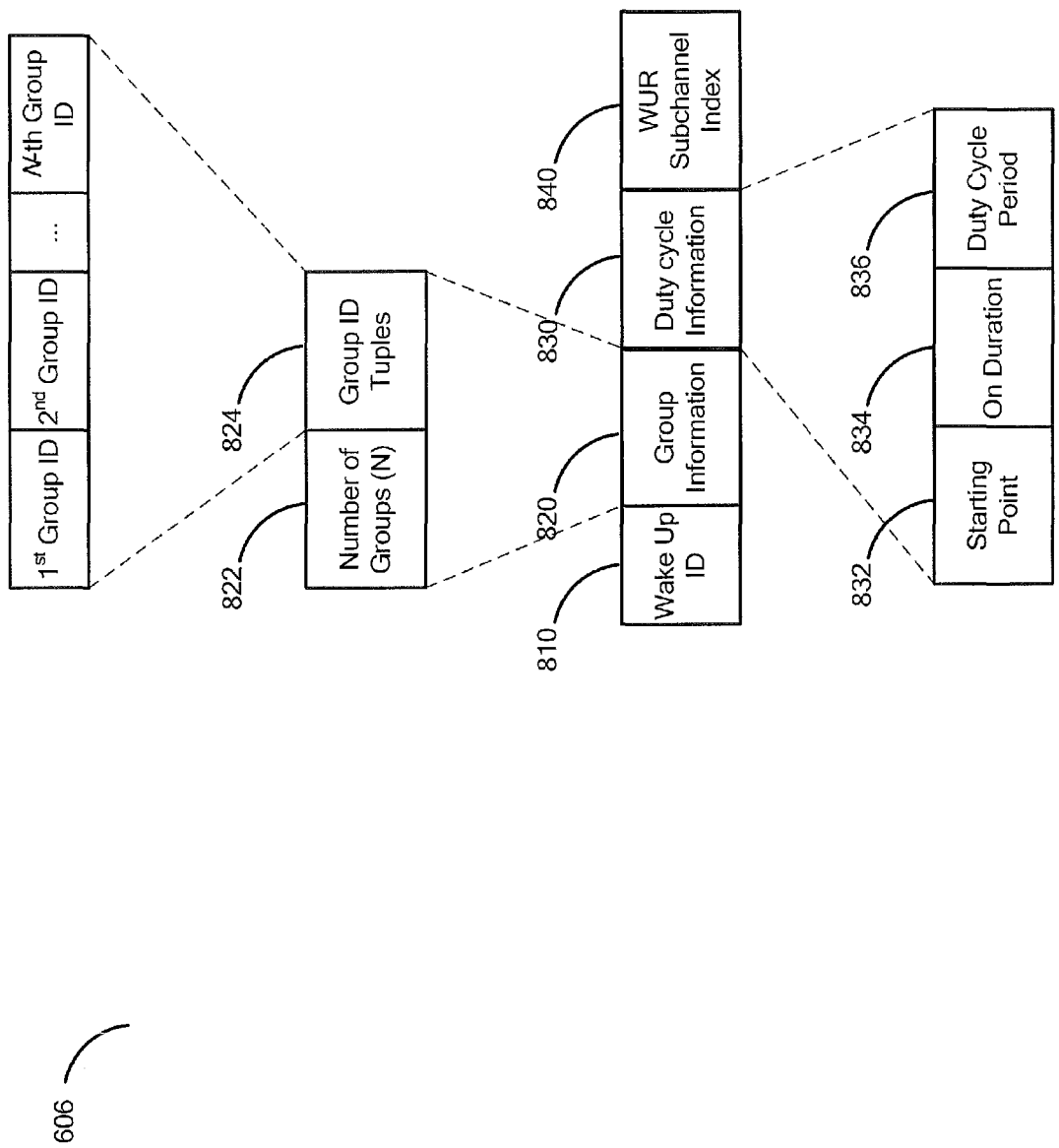
FIG. 8B is a diagram illustrating a first example format of WUR Parameters field of WUR Mode element transmitted by an AP according to the present disclosure.

FIG. 8B illustrates a first example format of WUR Parameters field 606 of the WUR Mode element 524 transmitted by the AP 110 according to the present disclosure. The WUR Parameters field 606 of the WUR Mode element 524 transmitted by the AP 110 comprises a Wake Up ID (identifier) field 810, a Group Information field 820, a Duty Cycle Information field 830 and a WUR Subchannel Index field 840. The Wake Up ID field 810 indicates the Wake Up ID assigned by the AP 110 to the intended WUR STA, which uniquely identifies the intended WUR STA in the BSS of the AP 110.

The Group Information field 820 comprises a Number of Groups field 822 and a Group ID Tuples field 824. The Number of Groups field 822 indicates the number of groups the intended WUR STA belongs to. The Group ID Tuples field 824 contains Group ID information for each of the groups the intended STA belongs to. A Group ID uniquely identifies a group of WUR STA in the BSS of the AP 110.

The Duty Cycle Information field 830 comprises a Starting Point field 832, a On Duration field 834 and a Duty Cycle Period field 836. The Starting Point field 832 indicates the determined start time of the intended STA's WUR duty cycle operation. The On Duration field 834 indicates the determined on duration that the intended STA's WURx will be in WURx Awake state for each WUR duty cycle schedule. The determined on duration is a multiple of time unit (1024 us) defined in the IEEE Std 802.11™-2016 for easy of implementation and shall be larger than or equal to the minimum on duration indicated by the Minimum On Duration field in the most recently transmitted WUR Operation element. The Duty Cycle Period field 836 indicates the determined elapsed time between the start times of two successive WUR duty cycle schedules. The Duty Cycle Period field 836 is based on the unit indicated by the Duty Cycle Period Unit field in the most recently transmitted WUR Operation element. Notice that for a WUR STA operating in WUR Mode, when the determined on duration is equal to the determined duty cycle period, its WURx is always in WURx Awake state if its PCR is in doze state.

Figure 21:
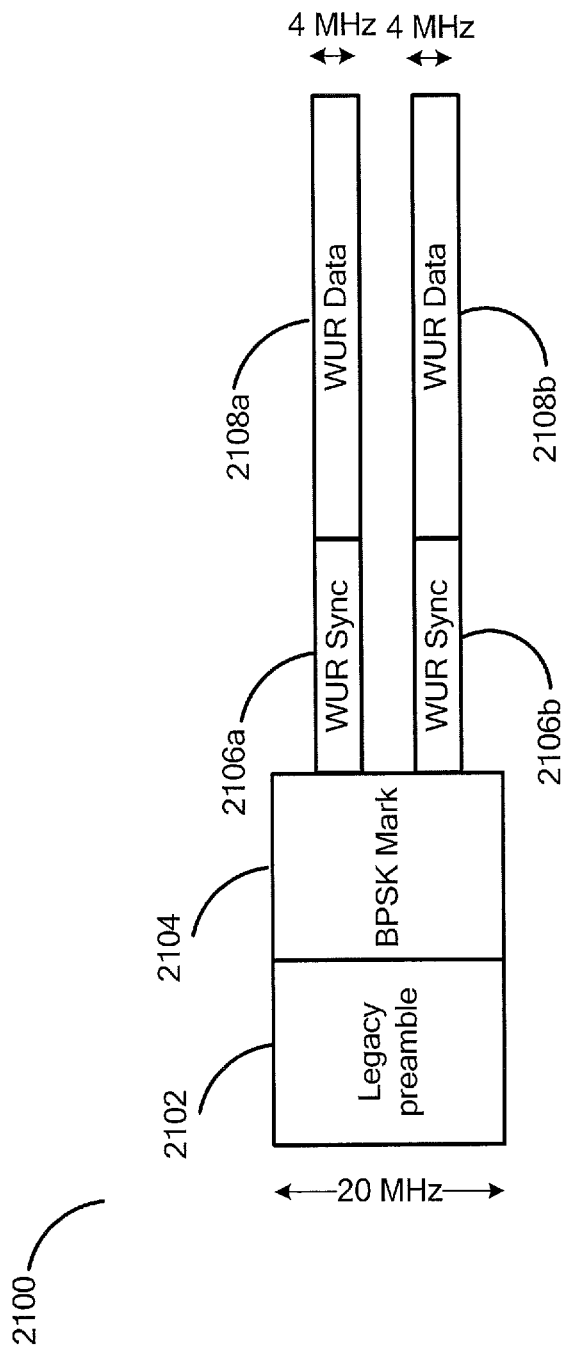
FIG. 21 is a diagram illustrating an example format of FDMA WUR PPDU according to the present disclosure.

The WUR Subchannel Index field 840 indicates the WUR subchannel over which the intended STA is able to receive WUR frame, especially when the WUR frame is carried in FDMA WUR PPDU (see FIG. 21). The WUR subchannel is inside the WUR channel specified by the WUR Operating Class field and the WUR Channel field in the WUR Operation element transmitted by the AP 110 during the synchronization procedure and the association procedure (see FIG. 2).

Figure 8C:
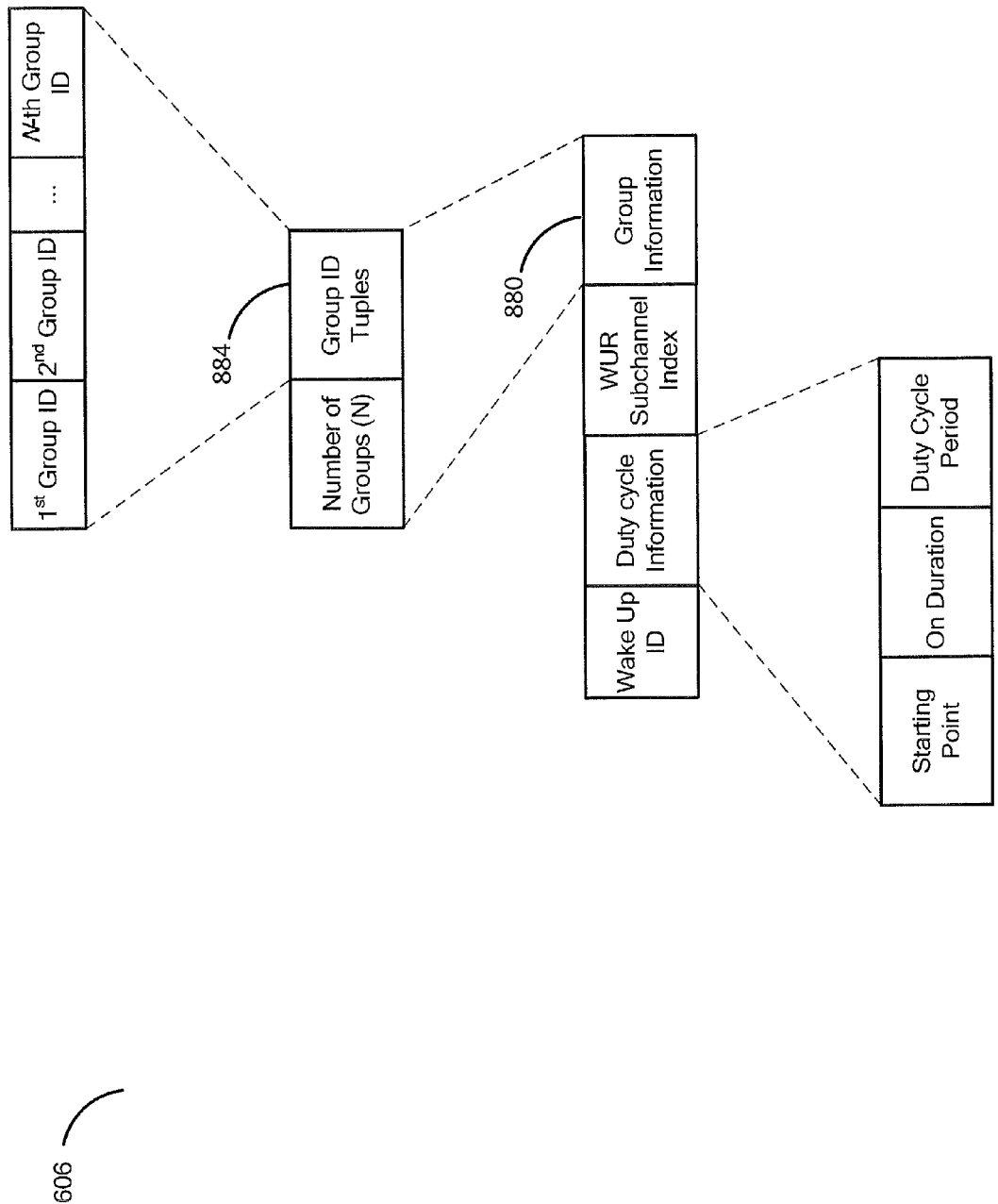
FIG. 8C is a diagram illustrating a second example format of WUR Parameters field of WUR Mode element transmitted by an AP according to the present disclosure.

FIG. 8C illustrates a second example format of WUR Parameters field 606 of the WUR Mode element 524 transmitted by the AP 110 according to the present disclosure. Compared with the first example format of WUR Parameters field 606 as illustrated in FIG. 8B, the Group Information field 880 is located at the end of the WUR Parameters field 606. This may make a procedure for storing and decoding the remaining fields of the WUR Parameters field 606 simple since the length of the Group ID Tuples field 884 is variable.

Figure 8D:
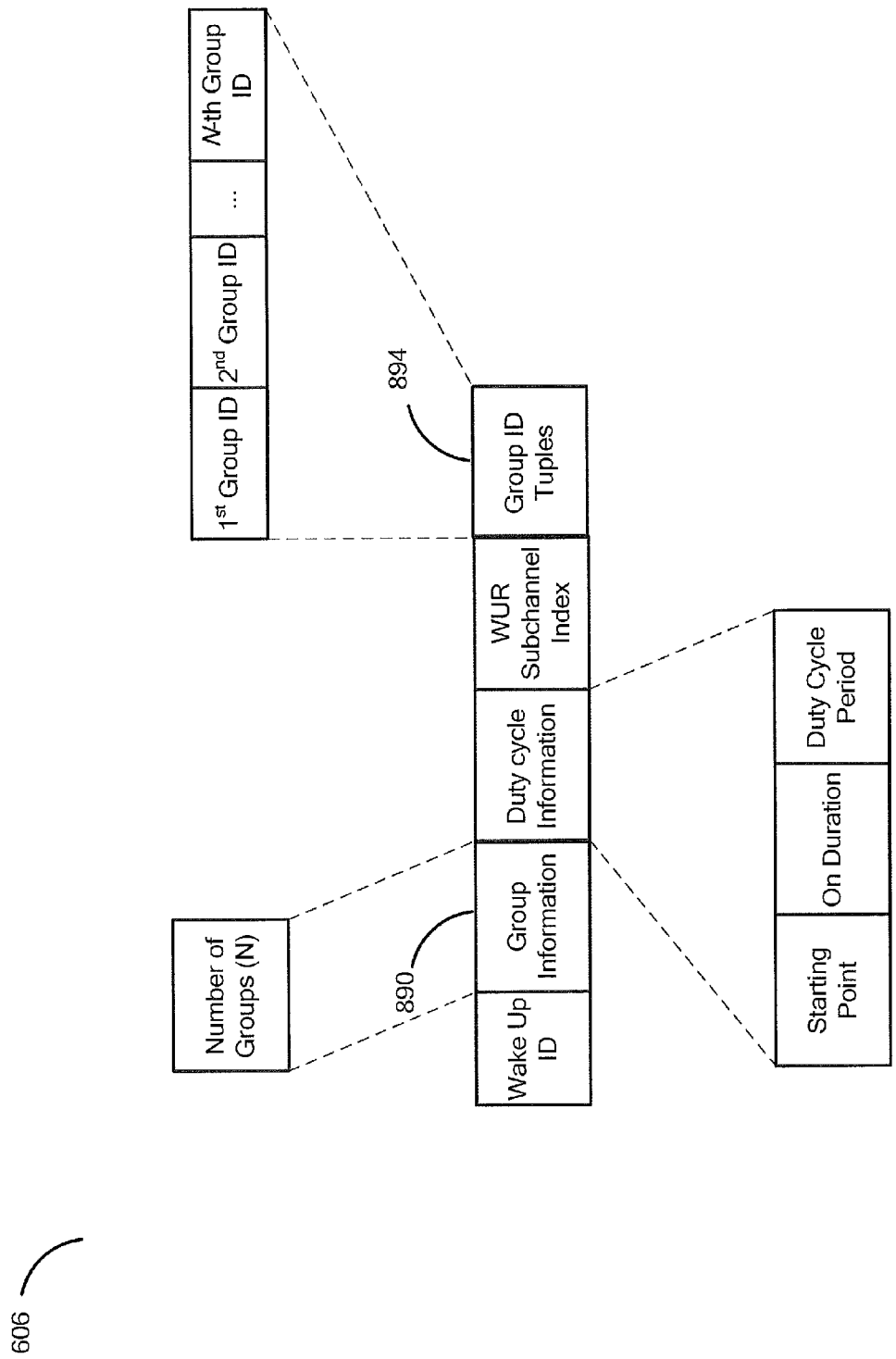
FIG. 8D is a diagram illustrating a third example format of WUR Parameters field of WUR Mode element transmitted by an AP according to the present disclosure.

FIG. 8D illustrates a third example format of WUR Parameters field 606 of the WUR Mode element 524 transmitted by the AP 110 according to the present disclosure. Compared with the first example format of WUR Parameters field 606 as illustrated in FIG. 8B, the Group ID Tuples field 894 is extracted from the Group Information field 890 and placed at the end of the WUR Parameters field 606. This may also make a procedure for storing and decoding the remaining fields of the WUR Parameters field 606 simple since the length of the Group ID Tuples field 894 is variable.

An Example Format of WUR Frame

Figure 11:
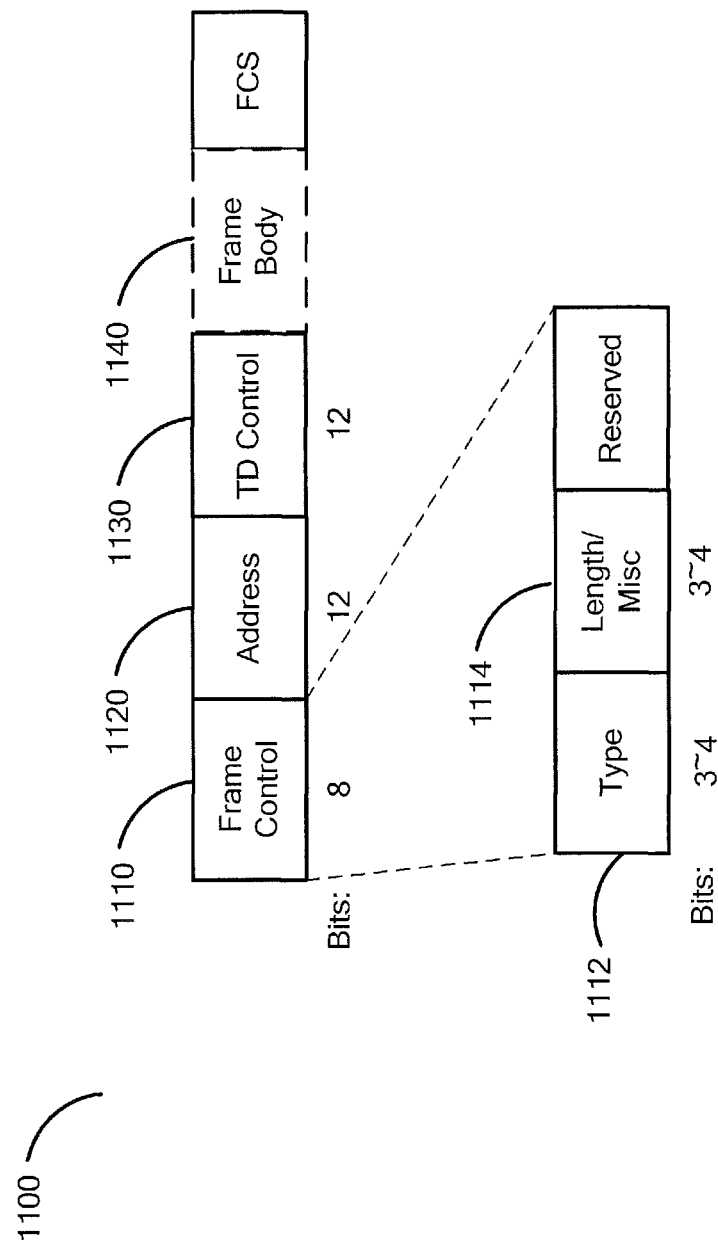
FIG. 11 is a diagram illustrating an example format of WUR frame according to the present disclosure.

FIG. 11 illustrates an example format of WUR frame 1100 according to the present disclosure. The WUR frame 1100 comprises a Frame Control field 1110, an Address field 1120 and a TD (type dependent) Control field 1130. The WUR frame 1100 may comprise a Frame Body field 1140. If any of the intended STA(s) of the WUR frame 1100 does not support non-zero length frame body, the Frame Body field 1140 shall not be present in the WUR frame 1100. The Frame Control field 1110 comprises a Type subfield 1112 and a Length/Misc subfield 1114. The Type subfield 1112 defines the type of the WUR frame 1100, as defined in FIG. 12. For example, the WUR frame 1100 with the Type subfield 1112 of the Frame Control field 1110 set to 0 is WUR Beacon frame; and the WUR frame 1100 with the Type subfield 1112 of the Frame Control field 1110 set to 1 is WUR Wake Up frame. The WUR frame 1100 has either constant length or variable length. The Length/Misc subfield 1114 contains the length of the Frame Body field 1140 if the WUR frame 1100 has variable length and contains bits that are expected to be used for other purposes if the WUR frame 1100 has constant length. The WUR Beacon frame has constant length and does not include the Frame Body field.

The 12-bit Address field 1120 contains an identifier for the WUR frame 1100. In other words, the Address field 1120 corresponds to an identifier's space comprising the unsigned integer within (0 4095). The identifier contained in the Address field 1120 depends on the type of the WUR frame 1100. In particular, as defined in FIG. 13, the Address field 1120 contains the Wake Up ID of the intended STA when the WUR frame 1100 is unicast (i.e., individually addressed) WUR Wake Up frame, the Group ID when the WUR frame 1100 is multicast (i.e., group addressed) WUR Wake Up frame, the Transmit ID when the WUR frame 1100 is broadcast WUR Wake Up frame or WUR Beacon frame, or the OUI1 when the WUR frame is WUR Vendor Specific frame. The OUI1 is represented by the 12 MSBs (Most Significant Bits) of the OUI (Vendor Organizationally Unique Identifier). The 12-bit TD Control field 1130 contains control information that depends on the type of the WUR frame 1100. For example, if the WUR frame 1100 is WUR Beacon frame, the TD Control field 1130 contains partial TSF (Time Synchronization Function).

For the WUR frame 1100 as illustrated in FIG. 11, unicast, multicast and broadcast WUR Wake Up frames have the same Type field. The challenge is how a WUR STA can properly identify whether it is the intended recipient of a received unicast, multicast or broadcast WUR Wake Up frame based on the Address field of the received WUR Wake Up frame.

First Embodiment

According to a first embodiment of the present disclosure, the Wake Up ID has a size of 12 bits but some values of the Wake Up ID are unused. The value range of the Wake Up ID is larger than the value range of the Group ID or the value range of the Transmit ID. For example, either the Group ID or the Transmit ID has a size of 8 bits.

Figure 15B:
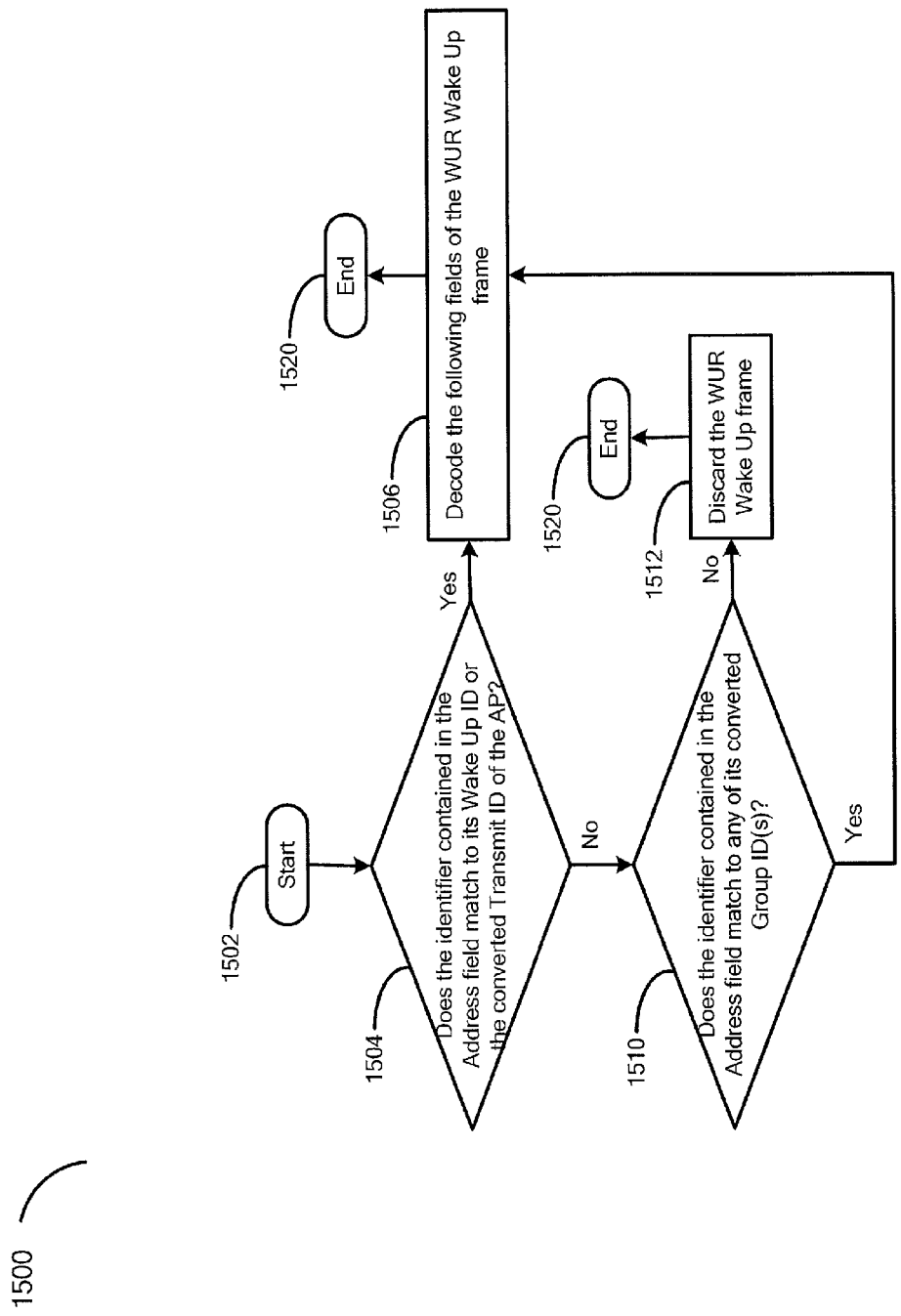
FIG. 15B is a diagram illustrating a first example frame filtering procedure according to the first embodiment of the present disclosure.
Figure 15C:
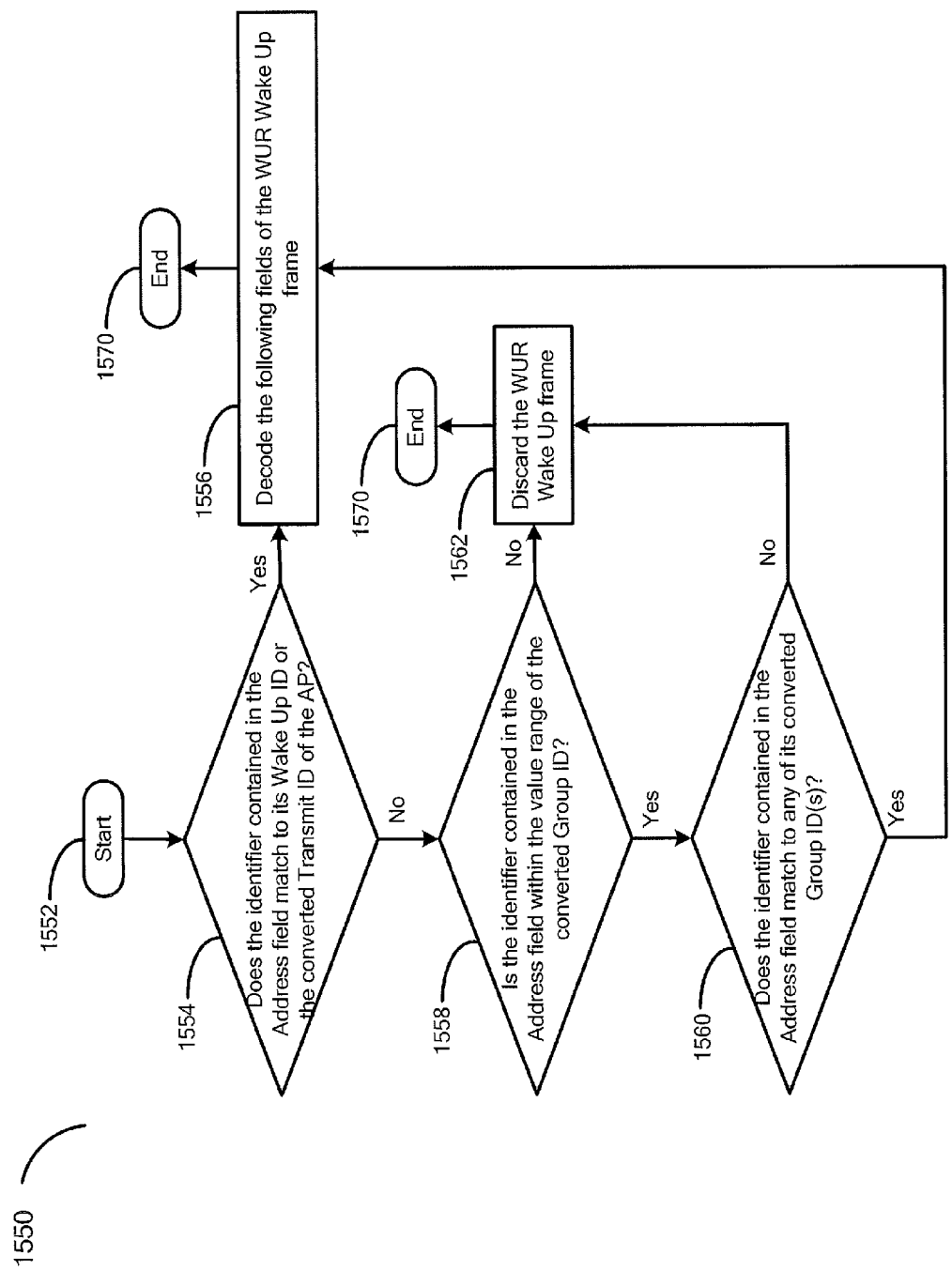
FIG. 15C is a diagram illustrating a second example frame filtering procedure according to the first embodiment of the present disclosure.

According to the first embodiment of the present disclosure, as defined in FIG. 14, the Address field 1120 of WUR Wake Up frame contains 12-bit Wake Up ID for unicast WUR Wake Up frame, 12-bit converted Group ID for multicast WUR Wake Up frame, 12-bit converted Transmit ID for broadcast WUR Wake Up frame, or OUI1 when the WUR frame is WUR Vendor Specific frame, wherein the 12-bit converted Group ID and the 12-bit converted Transmit ID take different unused values of the 12-bit Wake Up ID. In other words, the value ranges of the 12-bit converted Group ID, the 12-bit converted Transmit ID and the 12-bit Wake Up ID are mutually exclusive. As a result, a WUR STA is able to properly identify whether it is the intended recipient of a received unicast, multicast or broadcast WUR Wake Up frame based on the Address field of the received WUR Wake Up frame, as illustrated in FIG. 15B or 15C.

According to the first embodiment of the present disclosure, an 8-bit Transmit ID is the eight LSBs (Least Significant Bits) of the corresponding 12-bit converted Transmit ID. For example, for the 12-bit converted Transmit ID of 0x03B, the corresponding 8-bit Transmit ID is 0x3B. As a result, the value range of the converted Transmit ID is a subset of consecutive values of the Address field.

According to the first embodiment of the present disclosure, the value range of the converted Transmit ID is fixed (e.g., four MSBs of 12-bit converted Transmit ID is fixed to 0x0) but the value of converted Transmit ID of an AP is configurable in order to minimize collision among converted Transmit IDs of neighboring APs. In this case, if converted Transmit ID value of the AP 110 is randomly selected by the AP 110, it is enough to indicate only eight LSBs of the 12-bit converted Transmit ID of the AP 110 in the Transmit ID field of the WUR Operation element (see FIG. 3B) transmitted by the AP 110 during the synchronization procedure and the association procedure (see FIG. 2). As a result, channel overhead incurred by the WUR negotiation procedure is minimized.

According to the first embodiment of the present disclosure, an 8-bit Group ID is the eight LSBs of the corresponding 12-bit converted Group ID. For example, for the 12-bit converted Group ID of 0x14D, the corresponding 8-bit Group ID is 0x4D. As a result, the value range of the converted Group ID is a subset of consecutive values of the Address field.

According to the first embodiment of the present disclosure, the value range of the converted Group ID is fixed (e.g., four MSBs of 12-bit converted Group ID is fixed to 0x1). In this case, it is enough to indicate only eight LSBs of each 12-bit converted Group ID assigned by the AP 110 to a WUR STA in the Group ID Tuples field of the WUR Parameters field (see FIG. 8B, 8C or 8D) in the WUR Mode element transmitted by the AP 110 during the WUR negotiation procedure (see FIG. 2 and FIG. 4) between the AP 110 and the STA. As a result, channel overhead incurred by the WUR negotiation procedure is minimized.

FIG. 15A illustrates an example addressing space for the Address field of WUR Wake Up frame according to the first embodiment of the present disclosure. In this example, the converted Transmit ID has a value range of 0x000 to 0x0FF, the converted Group ID has a value range of 0x100 to 0x0FF, and the Wake Up ID has a value range of 0x200 to 0xFFF.

According to the first embodiment of the present disclosure, when a WUR STA receives a WUR PPDU containing WUR Wake Up frame, it may decode the Address field of the WUR Wake Up frame and perform a frame filtering procedure first.

FIG. 15B illustrates a first example frame filtering procedure 1500 according to the first embodiment of the present disclosure. The procedure 1500 starts at step 1502. At step 1504, the STA determines whether the identifier contained in the Address field of the received WUR Wake Up frame matches to its Wake Up ID or the converted Transmit ID of the AP 110. If the identifier contained in the Address field of the received WUR Wake Up frame matches to its Wake Up ID or the converted Transmit ID of the AP 110, at step 1506 the STA determines it is the intended recipient of the received WUR Wake Up frame and decodes the fields following the Address field of the received WUR Wake Up frame and then the procedure 1500 stops at step 1520. Otherwise the procedure 1500 proceeds to step 1510.

At step 1510, the STA determines whether the identifier contained in the Address field of the received WUR Wake Up frame matches to any of its converted Group IDs. If the identifier contained in the Address field of the received WUR Wake Up frame matches to any of its converted Group IDs, the procedure 1500 proceeds to step 1506. Otherwise at step 1512 the STA determines it is not the intended recipient of the received WUR Wake Up frame and discards the received WUR Wake Up frame and then the procedure 1500 stops at step 1520.

It should be noted that in the first example frame filtering procedure 1500, step 1504 can be swapped with step 1510.

According to the first embodiment of the present disclosure, when a WUR STA receives a WUR PPDU containing WUR Wake Up frame, by performing a frame filtering procedure 1500 as illustrated in FIG. 15B, the STA may need not to decode the fields following the Address field of the received WUR Wake Up frame and therefore power consumption of the STA can be reduced.

FIG. 15C illustrates a second example frame filtering procedure 1550 according to the first embodiment of the present disclosure. The procedure 1550 starts at step 1552. At step 1554, the STA determines whether the identifier contained in the Address field of the received WUR Wake Up frame matches to its Wake Up ID or the converted Transmit ID of the AP 110. If the identifier contained in the Address field of the received WUR Wake Up frame matches to its Wake Up ID or the converted Transmit ID of the AP 110, at step 1556 the STA determines it is the intended recipient of the received WUR Wake Up frame, and proceeds to decode the fields following the Address field of the received WUR Wake Up frame and then the procedure 1550 stops at step 1570. Otherwise the procedure 1550 proceeds to step 1558.

At step 1558, the STA determines whether the identifier contained in the Address field of the received WUR Wake Up frame is within the value range of the converted Group ID. If the identifier contained in the Address field of the received WUR Wake Up frame is not within the value range of the converted Group ID, at step 1562 the STA determines it is not the intended recipient of the received WUR Wake Up frame and discards the received WUR Wake Up frame and then the procedure 1550 stops at step 1570. Otherwise the procedure 1550 proceeds to step 1560.

At step 1560, the STA determines whether the identifier contained in the Address field of the received WUR Wake Up frame matches to any of its converted Group IDs. If the identifier contained in the Address field of the received WUR Wake Up frame matches to any of its converted Group IDs, the procedure 1550 proceeds to step 1556. Otherwise the procedure 1550 proceeds to step 1562.

According to the first embodiment of the present disclosure, the second example frame filtering procedure 1550 as illustrated in FIG. 15C may skip step 1560. Therefore, compared with the first example frame filtering procedure 1500 as illustrated in FIG. 15B, a WUR STA may be able to filter the received WUR Wake Up frames at a faster pace, especially in case of a large number of groups the STA belongs to.

Second Embodiment

According to a second embodiment of the present disclosure, the Wake Up ID has a size of 11 bits. The value range of the Wake Up ID is larger than the value range of the Group ID or the value range of the Transmit ID. For example, either the Group ID or the Transmit ID has a size of 8 bits.

Figure 17B:
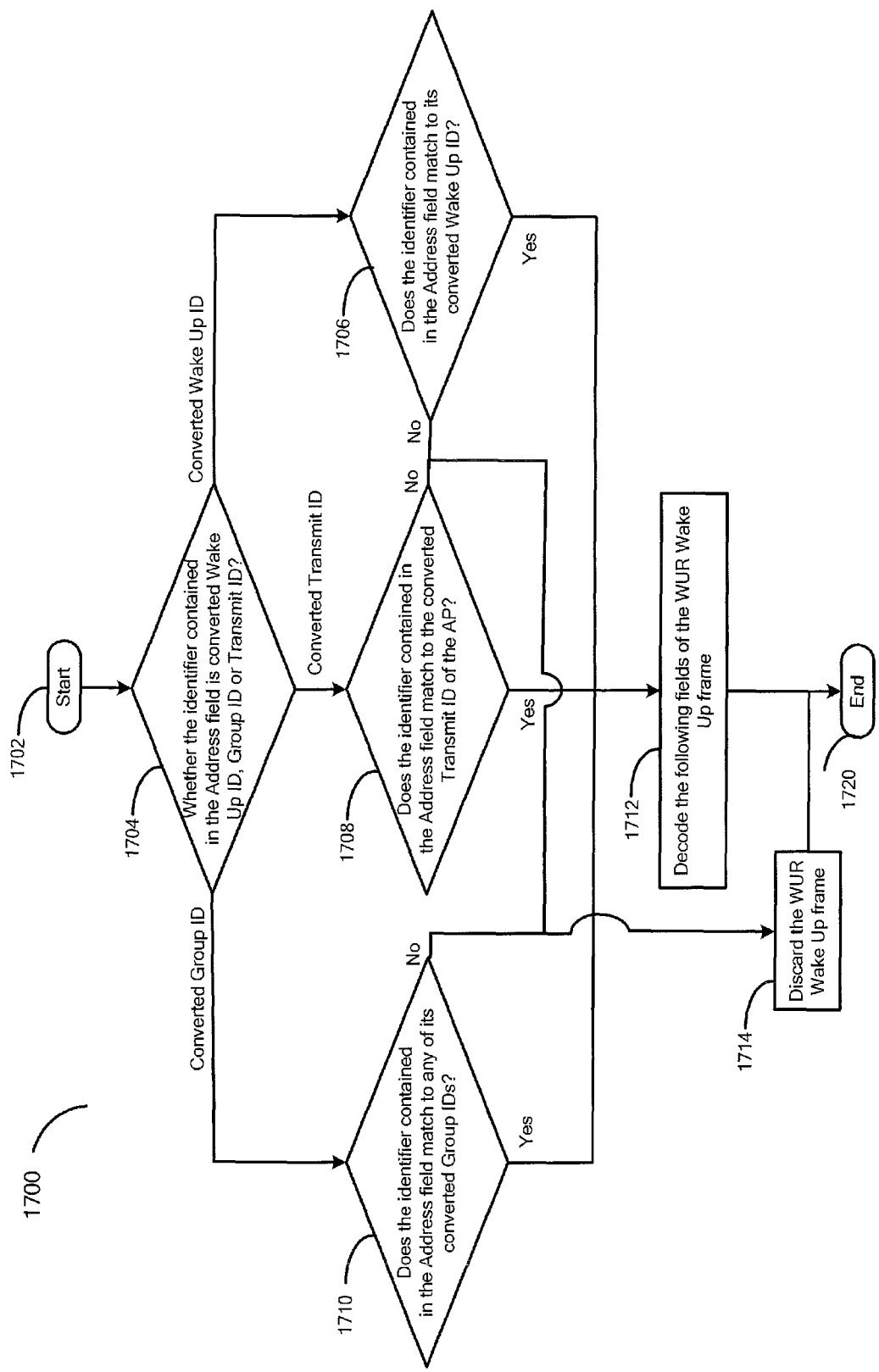
FIG. 17B is a diagram illustrating an example frame filtering procedure according to the second embodiment of the present disclosure.

According to the second embodiment of the present disclosure, as defined in FIG. 16, the Address field 1120 of WUR Wake Up frame contains 12-bit converted Wake Up ID for unicast WUR Wake Up frame, 12-bit converted Group ID for multicast WUR Wake Up frame, 12-bit converted Transmit ID for broadcast WUR Wake Up frame, or OUI1 when the WUR frame is WUR Vendor Specific frame, wherein the 12-bit converted Wake Up ID, the 12-bit converted Group ID and the 12-bit converted Transmit ID occupy different values of the Address field. In other words, the value ranges of the 12-bit converted Group ID, the 12-bit converted Transmit ID and the 12-bit Wake Up ID are mutually exclusive. As a result, a WUR STA is able to properly identify whether it is the intended recipient of a received unicast, multicast or broadcast WUR Wake Up frame based on the Address field of the received WUR Wake Up frame, as illustrated in FIG. 17B.

According to the second embodiment of the present disclosure, an 11-bit Wake Up ID is the eleven LSBs of the corresponding 12-bit converted Wake Up ID. For example, for the 12-bit converted Wake Up ID of 0x9FE, the corresponding 11-bit Wake Up ID is 0b00111111110. As a result, the value range of the converted Wake Up ID is a subset of consecutive values of the Address field.

According to the second embodiment of the present disclosure, the value range of the converted Wake Up ID is fixed (e.g., the MSB of 12-bit converted Wake Up ID is fixed to 1). In this case, it is enough to indicate only eleven LSBs of the 12-bit converted Wake Up ID assigned by the AP 110 to a WUR STA in the Wake Up ID field of the WUR Parameters field (see FIG. 8B, 8C or 8D) in the WUR Mode element transmitted by the AP 110 during the WUR negotiation procedure (see FIG. 2 and FIG. 4) between the AP 110 and the STA. As a result, channel overhead incurred by the WUR negotiation procedure is minimized.

According to the second embodiment of the present disclosure, an 8-bit Group ID is the eight LSBs of the corresponding 12-bit converted Group ID. For example, for the 12-bit converted Group ID of 0x44D, the corresponding 8-bit Group ID is 0x4D. As a result, the value range of the converted Group ID is a subset of consecutive values of the Address field.

According to the second embodiment of the present disclosure, the value range of the converted Group ID is fixed (e.g., four MSBs of 12-bit converted Group ID is fixed to 0x4). In this case, it is enough to indicate only eight LSBs of each 12-bit converted Group ID assigned by the AP 110 to a WUR STA in the Group ID Tuples field of the WUR Parameters field (see FIG. 8B, 8C or 8D) in the WUR Mode element transmitted by the AP 110 during the WUR negotiation procedure (see FIG. 2 and FIG. 4) between the AP 110 and the STA. As a result, channel overhead incurred by the WUR negotiation procedure is minimized.

According to the second embodiment of the present disclosure, an 8-bit Transmit ID is the eight LSBs of the corresponding 12-bit converted Transmit ID. For example, for the 12-bit converted Transmit ID of 0x03B, the corresponding 8-bit Transmit ID is 0x3B. As a result, the value range of the converted Transmit ID is a subset of consecutive values of the Address field.

According to the second embodiment of the present disclosure, the value range of the converted Transmit ID is fixed (e.g., four MSBs of 12-bit converted Transmit ID is fixed to "0x0") but the value of converted Transmit ID of an AP is configurable in order to minimize collision among converted Transmit IDs of neighboring APs. In this case, if converted Transmit ID value of the AP 110 is randomly selected by the AP 110, it is enough to indicate only eight LSBs of the 12-bit converted Transmit ID of the AP 110 in the Transmit ID field of the WUR Operation element (see FIG. 3B) transmitted by the AP 110 during the synchronization procedure and the association procedure (see FIG. 2). As a result, channel overhead incurred by the WUR negotiation procedure is minimized.

FIG. 17A illustrates an example addressing space for the Address field of WUR Wake Up frame according to the second embodiment of the present disclosure. In this example, the converted Transmit ID has a value range of 0x000 to 0x0FF, the converted Group ID has a value range of 0x400 to 0x4FF, and the converted Wake Up ID has a value range of 0x800 to 0xFFF.

According to the second embodiment of the present disclosure, a specific bit of the Address field, e.g., B11 (MSB) as illustrated in FIG. 17A, indicates whether a WUR Wake Up frame is unicast or not. Another specific bit of the Address field, e.g., B10 as illustrated in FIG. 17A, further differentiates multicast WUR Wake Up frame from broadcast WUR Wake Up frame. Compared with the first embodiment of the present disclosure, it is much easier for a WURx to identify unicast, multicast and broadcast WUR Wake Up frames.

According to the second embodiment of the present disclosure, when a WUR STA receives a WUR PPDU containing WUR Wake Up frame, it may decode the Address field of the WUR Wake Up frame and perform a frame filtering procedure first.

FIG. 17B illustrates an example frame filtering procedure 1700 according to the second embodiment of the present disclosure. The procedure 1700 starts at step 1702. At step 1704, the STA determines whether the identifier contained in the Address field of the received WUR Wake Up frame is converted Wake Up ID, converted Group ID or converted Transmit ID by checking the B11 (MSB) and B10 of the Address field. If the identifier contained in the Address field of the received WUR Wake Up frame is converted Wake Up ID, the procedure 1700 proceeds to step 1706. If the identifier contained in the Address field of the received WUR Wake Up frame is converted Group ID, the procedure 1700 proceeds to step 1710. If the identifier contained in the Address field of the received WUR Wake Up frame is converted Transmit ID, the procedure 1700 proceeds to step 1708.

At step 1706 the STA determines whether the identifier contained in the Address field of the received WUR Wake Up frame matches to its converted Wake Up ID. If the identifier contained in the Address field of the received WUR Wake Up frame matches to its converted Wake Up ID, at step 1712 the STA determines it is the intended recipient of the received WUR Wake Up frame and decodes the fields following the Address field of the received WUR Wake Up frame and then the procedure 1700 stops at step 1720. Otherwise at step 1714 the STA determines it is not the intended recipient of the received WUR Wake Up frame and discards the WUR Wake Up frame and then the procedure 1700 stops at step 1720.

At step 1708, the STA determines whether the identifier contained in the Address field of the received WUR Wake Up frame matches to the converted Transmit ID of the AP 110. If the identifier contained in the Address field of the received WUR Wake Up frame matches to the converted Transmit ID of the AP 110, the procedure 1700 proceeds to step 1712. Otherwise the procedure 1700 proceeds to step 1714.

At step 1710, the STA determines whether the identifier contained in the Address field of the received WUR Wake Up frame matches to any of its converted Group IDs. If the identifier contained in the Address field of the received WUR Wake Up frame matches to any of its converted Group IDs, the procedure 1700 proceeds to step 1712. Otherwise the procedure 1700 proceeds to step 1714.

According to the second embodiment of the present disclosure, when a WUR STA receives a WUR PPDU containing WUR Wake Up frame, by performing a frame filtering procedure 1700 as illustrated in FIG. 17B, the STA may need not to decode the fields following the Address field of the WUR Wake Up frame and therefore power consumption of the STA can be reduced.

Third Embodiment

According to a third embodiment of the present disclosure, as defined in FIG. 13, the Address field of WUR Wake Up frame contains Wake Up ID for unicast WUR Wake Up frame, Group ID for multicast WUR Wake Up frame or Transmit ID for broadcast WUR Wake Up frame. Each of Wake Up ID, Group ID and Transmit ID has a size of 12 bits.

According to the third embodiment of the present disclosure, the value range of Group ID is a subset of consecutive values of the Address field. The value range of Group ID is either fixed or configurable. If the value range of Group ID is configurable, the value range of Group ID for the BSSs of different APs may be different. As a result, the probability of assigning the same Group ID by different APs is minimized, which is instrumental for a WUR STA to filter multicast WUR Wake Up frames properly using the Address field.

According to the third embodiment of the present disclosure, if the value range of Group ID is fixed (e.g., four MSBs of 12-bit Group ID is fixed to 0x4), it is enough to indicate only eight LSBs of each 12-bit Group ID assigned by the AP 110 to a WUR STA in the Group ID Tuples field of the WUR Parameters field (see FIG. 8B, 8C or 8D) in the WUR Mode element transmitted by the AP 110 during the WUR negotiation procedure (see FIG. 2 and FIG. 4) between the AP 110 and the STA. As a result, channel overhead incurred by the WUR negotiation procedure is minimized.

According to the third embodiment of the present disclosure, if the value range of Group ID is configurable, in addition to eight LSBs of each 12-bit Group ID assigned by the AP 110 to a WUR STA, four MSBs of 12-bit Group ID are indicated in the Group ID Range Indication field of the WUR Operation element (see FIG. 3B) transmitted by the AP 110 during the synchronization procedure and the association procedure. As a result, the STA is able to know the assigned Group IDs from the Group ID Tuples field of the WUR Parameters field in the WUR Mode element received during the WUR negotiation procedure between the AP 110 and the STA and the Group ID Range Indication field of the WUR Operation element received during the synchronization procedure and the association procedure.

According to the third embodiment of the present disclosure, the 12-bit Wake Up ID assigned by the AP 110 to a WUR STA is indicated in the Wake Up ID field of the WUR Parameters field (see FIG. 8B, 8C or 8D) in the WUR Mode element transmitted by the AP 110 during the WUR negotiation procedure (see FIG. 2 and FIG. 4) between the AP 110 and the STA.

According to the third embodiment of the present disclosure, the value of Transmit ID of an AP is configurable in order to minimize collision among Transmit IDs of neighboring APs. If Transmit ID value of the AP 110 is randomly selected by the AP 110, the 12-bit Transmit ID of the AP 110 is indicated in the Transmit ID field of the WUR Operation element (see FIG. 3B) transmitted by the AP 110 during the synchronization procedure and the association procedure (see FIG. 2) between the AP 110 and the STA.

According to the third embodiment of the present disclosure, a WUR Wake Up frame with the Address field set to the special ID of 0x000 is a special broadcast WUR Wake Up frame, in which the Frame Body is present and contains two or more Wake Up IDs. In other words, this special broadcast WUR Wake Up frame is used to wake up the two or more WUR STAs.

According to the third embodiment of the present disclosure, the values of Wake Up IDs assigned by the AP 110 to the associated WUR STAs, the values of Group IDs assigned by the AP 110 to the associated WUR STAs, the value of special ID and the value of Transmit ID of the AP 110 shall be different. As a result, a WUR STA is able to identify whether it is the intended recipient of a received WUR Wake Up frame based on its Address field, as illustrated in FIG. 18B.

FIG. 18A illustrates an example addressing space for the Address field of WUR Wake Up frame according to the third embodiment of the present disclosure. In this example, Transmit ID takes the value of 0x500, Group ID has a value range of 0x400 to 0x4FF, and Wake Up ID has a value range of 0x100 to 0x3FF and 0x501 to 0xFFF. In addition, there is a special ID of 0x000.

According to the third embodiment of the present disclosure, when a WUR STA receives a WUR PPDU containing WUR Wake Up frame, it may decode the Address field of the WUR Wake Up frame and perform a frame filtering procedure first.

Figure 18B:
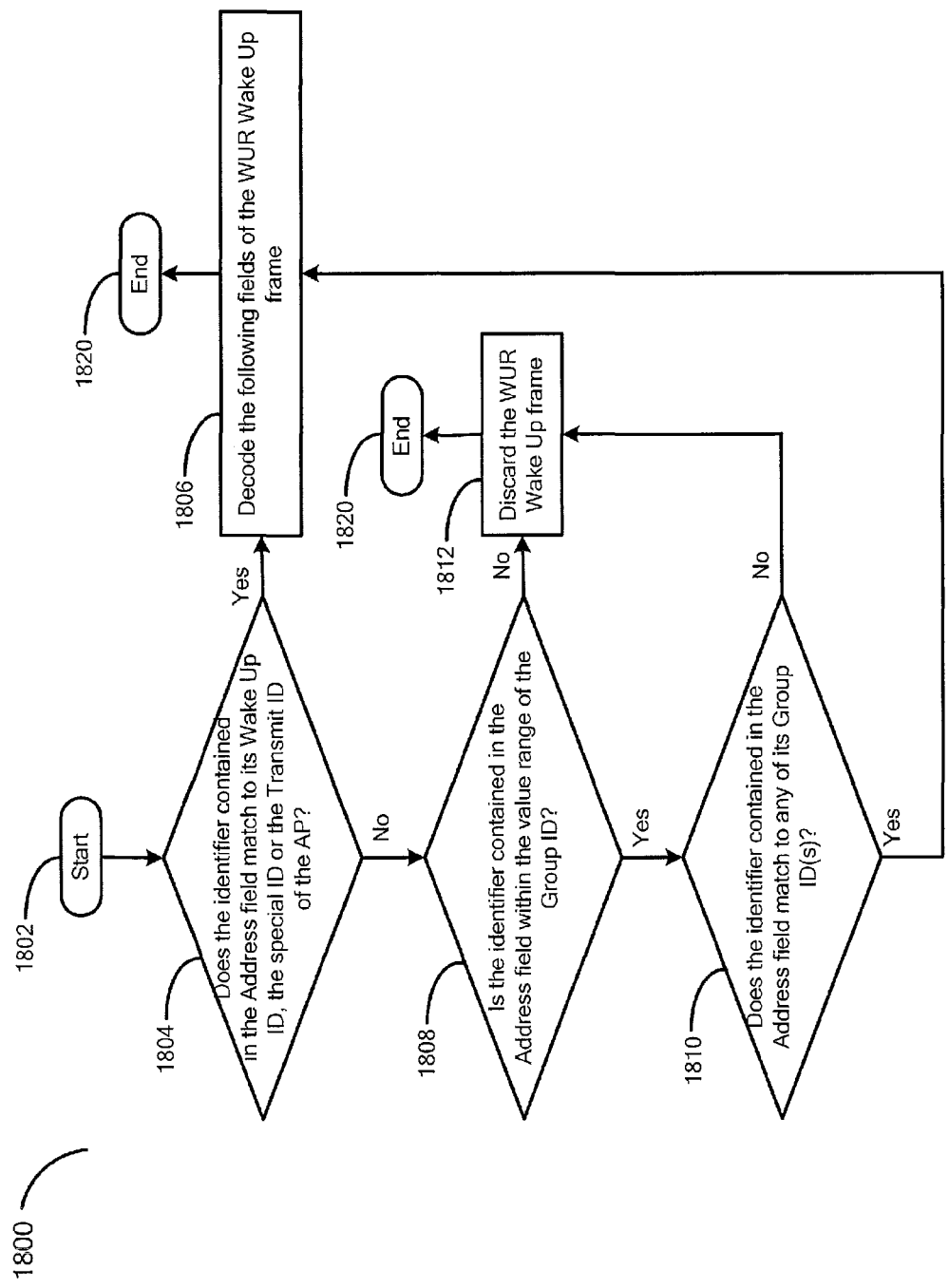
FIG. 18B is a diagram illustrating an example frame filtering procedure according to the third embodiment of the present disclosure.

FIG. 18B illustrates an example frame filtering procedure 1800 according to the third embodiment of the present disclosure. The procedure 1800 starts at step 1802. At step 1804, the STA determines whether the identifier contained in the Address field of the received WUR Wake Up frame matches to its Wake Up ID, the special ID or the Transmit ID of the AP 110. If the identifier contained in the Address field of the received WUR Wake Up frame matches to its Wake Up ID, the special ID or the Transmit ID of the AP 110, at step 1806 the STA determines it is the intended recipient of the received WUR Wake Up frame and decodes the fields following the Address field of the received WUR Wake Up frame and then the procedure 1800 stops at step 1820. Otherwise the procedure 1800 proceeds to step 1808.

At step 1808, the STA determines whether the identifier contained in the Address field of the received WUR Wake Up frame is within the value range of the Group ID. If the identifier contained in the Address field of the received WUR Wake Up frame is not within the value range of the Group ID, at step 1812 the STA determines it is not the intended recipient of the received WUR Wake Up frame and discards the received WUR Wake Up frame and then the procedure 1800 stops at step 1820. Otherwise the procedure 1800 proceeds to step 1810.

At step 1810, the STA determines whether the identifier contained in the Address field of the received WUR Wake Up frame matches to any of its converted Group IDs. If the identifier contained in the Address field of the received WUR Wake Up frame matches to any of its converted Group IDs, the procedure 1800 proceeds to step 1806. Otherwise the procedure 1800 proceeds to step 1812.

According to the third embodiment of the present disclosure, when a WUR STA receives a WUR PPDU containing WUR Wake Up frame, by performing a frame filtering procedure 1800 as illustrated in FIG. 18B, the STA may need not to decode the fields following the Address field of the WUR Wake Up frame and therefore power consumption of the STA can be reduced.

An Example Format of WUR Beacon Frame

FIG. 19 illustrates an example format of WUR Beacon frame 1900 according to the present disclosure. The WUR Beacon frame 1900 is a WUR frame (see FIG. 11) with the Type field set to 0. The WUR Beacon frame 1900 comprises a Frame Control field 1910 and a TD Control field 1930. The Frame Control field 1910 comprises a Misc field 1914. The Misc field 1914 and the TD Control field 1930 jointly indicates the partial TSF. In more details, the Misc field 1914 contains lower portion of partial TSF while the TD Control field 1930 contains higher portion of partial TSF. For example, if 15-bit partial TSF is carried in WUR Beacon frame, the Misc field 1914 contains three LSBs of 15-bit partial TSF and the TD Control field 1930 contains twelve MSBs of 15-bit partial TSF. As a result, a WUR STA is able to achieve better WUR synchronization.

An Example Format of WUR PPDU

FIG. 20 illustrates an example format of non-FDMA WUR PPDU 2000 according to the present disclosure. The WUR PPDU 2000 comprises a legacy preamble 2002, a BPSK (binary phase shift keying) Mark field 2004, a WUR Sync field 2006 and a WUR Data field 2008. The legacy preamble 2002 and the BPSK Mark field 2004 are transmitted with 20 MHz bandwidth while the WUR Sync field 2006 and the WUR Data field 2008 are transmitted with a much narrower bandwidth (e.g., 4 MHz). The legacy preamble 2002 and the BPSK Mark field 2004 assist third party STAs in avoiding unnecessary channel access collision. The WUR Sync field 2006 aims to be used by WURx to perform time synchronization and packet detection. The WUR Sync field 2006 is also used to indicate the data rate of the WUR Data field 2008. The WUR Data field 2008 contains a WUR frame (e.g., WUR Beacon frame or WUR Wake Up frame). The WUR Sync field 2006 and the WUR Data field 2008 are transmitted over a WUR subchannel. The WUR subchannel assigned by the AP 110 to a WUR STA which is intended recipient of the WUR frame is indicated in the WUR Subchannel Index field of the WUR Parameters field in the WUR Mode element transmitted by the AP 110 during the WUR negotiation procedure between the AP 110 and the STA.

FIG. 21 illustrates an example format of FDMA WUR PPDU 2100 according to the present disclosure. The WUR PPDU 2100 comprises a legacy preamble 2102, a BPSK Mark field 2104, a first WUR Sync field 2106a, a second WUR Sync field 2106b, a first WUR Data field 2108a and a second WUR Data field 2108b. The legacy preamble 2102 and the BPSK Mark field 2104 are transmitted with 20 MHz bandwidth while each of the first WUR Sync field 2106a, the second WUR Sync field 2106b, the first WUR Data field 2108a and the second WUR Data field 2108b is transmitted with a much narrower bandwidth (e.g., 4 MHz). The legacy preamble 2102 and the BPSK Mark field 2104 assist third party STAs in avoiding unnecessary channel access collision.

The first WUR Sync field 2106a aims to be used by WURx to perform time synchronization and packet detection. The first WUR Sync field 2106a is also used to indicate the data rate of the first WUR Data field 2108a. The first WUR Data field 2108a contains a first WUR frame. The first WUR Sync field 2106a and the first WUR Data field 2108a are transmitted over a first WUR subchannel. The first WUR subchannel assigned by the AP 110 to a WUR STA which is intended recipient of the first WUR frame is indicated in the WUR Subchannel Index field of the WUR Parameters field in the WUR Mode element transmitted by the AP 110 during the WUR negotiation procedure between the AP 110 and the STA.

The second WUR Sync field 2106b aims to be used by WURx to perform time synchronization and packet detection. The second WUR Sync field 2106b is also used to indicate the data rate of the second WUR Data field 2108b. The second WUR Data field 2108b contains a second WUR frame. The second WUR Sync field 2106b and the second WUR Data field 2108b are transmitted over a second WUR subchannel. The second WUR subchannel assigned by the AP 110 to a WUR STA which is intended recipient of the second WUR frame is indicated in the WUR Subchannel Index field of the WUR Parameters field in the WUR Mode element transmitted by the AP 110 during the WUR negotiation procedure between the AP 110 and the STA.

According to the present disclosure, the first WUR frame contained in the first WUR Data field 2108a and the second WUR frame contained in the second WUR Data field 2108b are addressed to different WUR STAs. For one example, neither the first WUR frame contained in the first WUR Data field 2108a nor the second WUR frame contained in the second WUR Data field 2108b is broadcast WUR Wake Up frame or WUR Beacon frame. For another example, given that the first WUR frame contained in the first WUR Data field 2108a is unicast WUR Wake Up frame while the second WUR frame contained in the second WUR Data field 2108b is multicast WUR Wake Up frame, the intended STA of the first WUR frame shall not belong to the intended group of STAs of the second WUR frame. By doing so, a WUR STA need not to simultaneously receive more than one WUR frame over different WUR channels, which reduces implementation complexity significantly.

Configuration of a WUR Apparatus

Figure 22A:
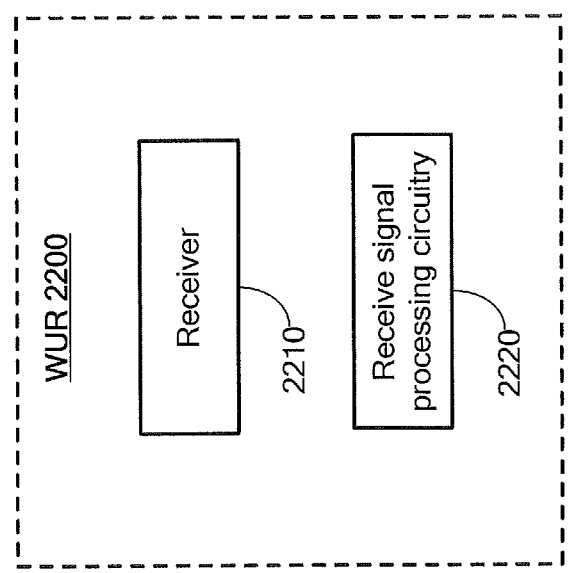
FIG. 22A is a simple block diagram of an example WUR according to the present disclosure.

FIG. 22A is a simple block diagram of an example WUR 2200. The WUR 2200 may be the WUR 134 in the STA 130 or the WUR 144 in the STA 140 as illustrated in FIG. 1. The WUR 2200 comprises a receiver 2210 and a receive signal processing circuitry 2220. The receiver 2210 is responsible for reception of WUR signal, and the receive signal processing circuitry 2220 is responsible for processing the received WUR signal.

Figure 22B:
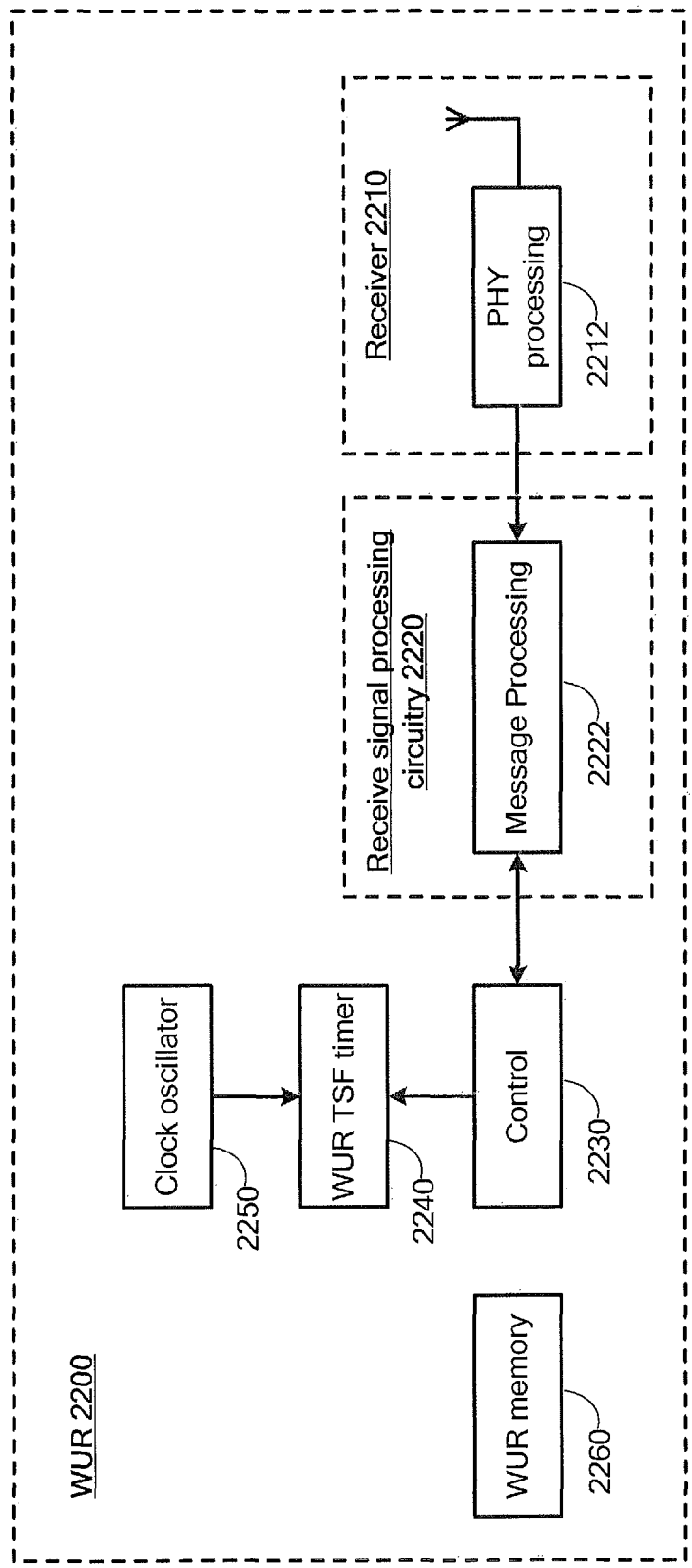
FIG. 22B is a detailed block diagram of the example WUR according to the present disclosure.

FIG. 22B is a detailed block diagram of the example WUR 2200. The WUR 2200 further comprises a control circuitry 2230, a WUR memory 2260, and a WUR TSF timer 2240 which is derived by a clock oscillator 2250. The control circuitry 2230 is used to control general MAC protocol operations. In particular, the control circuitry 2230 is used to set the WUR TSF timer 2240 according to received partial TSF. The receiver 2210 of the WUR 2200 comprises a PHY processing circuitry 2212, which is responsible for converting WUR PPDUs received through antennas into WUR frames. The receive signal processing circuitry 2220 of the WUR 2200 comprises a message processing circuitry 2222, which is responsible for processing the received WUR frames under the control of the control circuitry 2230 and passing the corresponding WUR frame information to the control circuitry 2230. For example, the message processing circuitry 2222 is used to extract the partial TSF from each of the received WUR Beacon frames. The received WUR frames are configured according to the various embodiments of the present disclosure. The WUR memory 2260 is responsible for storing the WUR parameters negotiated between the WUR STA (e.g., 130 or 140) containing the WUR 2200 and the AP 110, especially when the WUR STA operates in WUR Mode Suspend.

The WUR 2200 may comprise many other components that are not illustrated, for sake of clarity, in FIG. 22A and FIG. 22B. Only those components that are most pertinent to the present disclosure are illustrated.

Configuration of a PCR Apparatus

Figure 23A:
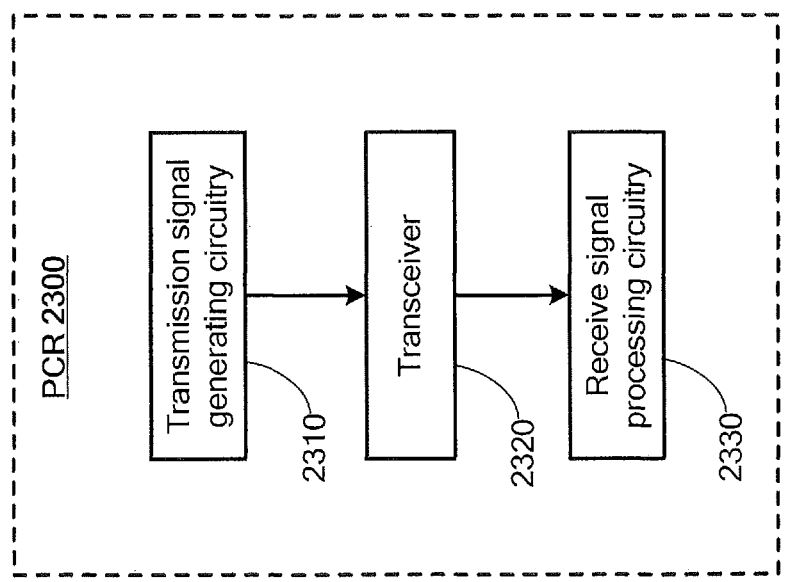
FIG. 23A is a simple block diagram of an example PCR according to the present disclosure.

FIG. 23A is a simple block diagram of an example PCR 2300 which is capable for transmitting and receiving standard IEEE 802.11 signal. The PCR 2300 may be the PCR 112 in the AP 110, the PCR 132 in the STA 130 or the PCR 142 in the STA 140 as illustrated in FIG. 1. In particular, the PCR 112 in the AP 110 is also capable for transmitting WUR signal. The PCR 2300 comprises a transmission signal generating circuitry 2310, a transceiver 2320 and a receive signal processing circuitry 2330. The transmission signal generating circuitry 2310 is responsible for generating standard IEEE 802.11 signal and WUR signal if applicable, the transceiver 2320 is responsible for transmitting the generated standard IEEE 802.11 signal and WUR signal if applicable as well as receiving the standard IEEE 802.11 signal, and the receive signal processing circuitry 2330 is responsible for processing the received standard IEEE 802.11 signal.

Figure 23B:
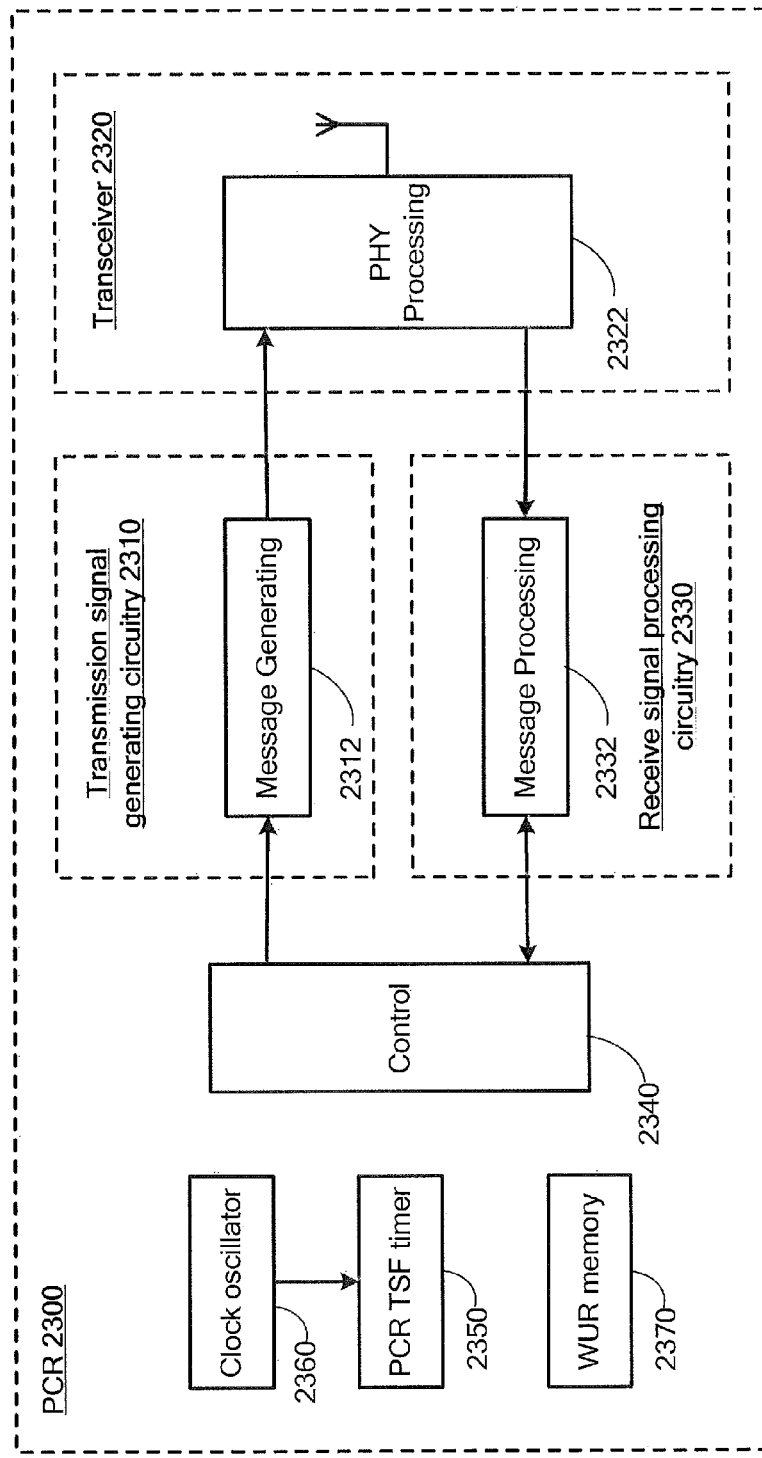
FIG. 23B is a detailed block diagram of the example PCR according to the present disclosure.

FIG. 23B is a detailed block diagram of the example PCR 2300. The PCR 2300 further comprises a control circuitry 2340 and a PCR TSF timer 2350 which is drived by a clock oscillator 2360. The control circuitry 2340 is used to control general MAC protocol operation. The transmission signal generating circuitry 2310 comprises a message generating circuitry 2312, which is responsible for generating MAC frames (e.g., Beacon frame, Probe Request/Response frame, Association Request/Response frame, WUR Action frame and WUR frame) under the control of the control circuitry 2340 according to various embodiments of the present disclosure. The transceiver 2320 comprises a PHY processing circuitry 2322, which is responsible for formulating the generated MAC frames into PPDUs including WUR PPDUs and transmitting them through antennas as well as converting PPDUs excluding WUR PPDUs received through the antennas into MAC frames. The receive signal processing circuitry 2330 comprises a message processing circuitry 2332, which is responsible for processing the received MAC frames (e.g., parsing MAC Header, etc.) under the control of the control circuitry 2340 and passing the corresponding MAC information to the control circuitry 2340.

According to the present disclosure, when the PCR 2300 is used in the AP 110, it further comprises a WUR memory 2370, which is responsible for storing the WUR parameters negotiated between the WUR STAB (e.g., 130 and 140) and the AP 110, especially when the WUR STAB operate in WUR Mode Suspend.

The PCR 2300 may comprise many other components that are not illustrated, for sake of clarity, in FIG. 23A and FIG. 23B. Only those components that are most pertinent to the present disclosure are illustrated.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Should a circuit integration technology replacing LSI appear as a result of advancements in semiconductor technology or other technologies derived from the technology, the functional blocks could be integrated using the future integrated circuit technology. Another possibility is the application of biotechnology and/or the like.

The present disclosure can be realized by any kind of apparatus, device or system having a function of communication, which is referred as a communication apparatus. Some non-limiting examples of such communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

The disclosure of U.S. Provisional Application No. 62/598,942, filed on Dec. 14, 2017 and Japanese Patent Application No. 2018-032821, filed on Feb. 27, 2018, including the specification, drawings and abstract, is incorporated herein by reference in its entirety.

INDUSTRIAL APPLICABILITY

This disclosure can be applied to an apparatus and a method for WUR mode operation in a wireless network.

REFERENCE SIGNS LIST

110 AP
130, 140 STA
112, 132, 142, 2300 PCR
134, 144, 2200 WUR
2210 Receiver
2212, 2322 PHY processing circuitry
2220, 2330 Receive signal processing circuitry
2222, 2332 Message processing circuitry
2230, 2340 Control circuitry
2240 WUR TSF timer
2250, 2360 Clock oscillator
2310 Transmission signal generating circuitry
2312 Message generating circuitry
2320 Transceiver
2350 PCR TSF timer
2260, 2370 WUR memory

The invention claimed is:

1. A transmission apparatus comprising:
circuitry which, in operation, assigns identifiers (IDs), the IDs including a Wake up Radio (WUR) ID that identifies a station, a WUR group ID that identifies a group of one or more stations, and a transmitter ID that identifies the transmission apparatus; and
a transmitter which, in operation, transmits a WUR frame including a type field and only one ID field which corresponds to a space of one ID and indicates one of the IDs,
wherein the IDs are mutually exclusive in the space of the one ID including an unsigned integer from 0 to 4095, and the only one ID field indicates one or more receivers of the WUR frame, and
wherein the assigned IDs are configurable, and the circuitry, in operation, changes the assigned IDs and causes the transmitter to transmit a WUR element including the changed IDs.

2. The transmission apparatus according to claim 1, wherein the WUR ID uniquely identifies the station in a Basic Service Set (BSS) to which the transmission apparatus belongs, and the station is associated with the transmission apparatus.

3. The transmission apparatus according to claim 1, wherein the WUR group ID uniquely identifies the group of one or more stations in a Basic Service Set (BSS) to which the transmission apparatus belongs, wherein each of the one or more stations is associated with the transmission apparatus.

4. The transmission apparatus according to claim 1, wherein the circuitry assigns the transmitter ID to the only one ID field when the WUR frame is a broadcast WUR frame.

5. The transmission apparatus according to claim 1, wherein a value range of the WUR group ID is a subset of consecutive values obtained from the space of the one ID.

6. The transmission apparatus according to claim 1, wherein a portion of the WUR group ID is indicated to the one or more stations which are associated with the transmission apparatus during a WUR negotiation procedure.

7. The transmission apparatus according to claim 6, wherein the portion of the WUR group ID comprises a plurality of Least Significant Bits (LSBs) of the WUR group ID.

8. The transmission apparatus according to claim 1, wherein a value range of the WUR group ID is configurable.

9. The transmission apparatus according to claim 8, wherein the value range of the WUR group ID is indicated to the one or more stations which are associated with the transmission apparatus.

10. The transmission apparatus according to claim 1,
wherein the WUR ID and the WUR group ID are a converted WUR ID and a converted WUR group ID, respectively, and
wherein the converted WUR ID and the converted WUR group ID occupy different value ranges of the space of the one ID.

11. A transmission method for a transmission apparatus, the transmission method comprising:
assigning identifiers (IDs), the IDs including a Wake up Radio (WUR) identifier (ID) that identifies a station, a WUR group ID that identifies a group of one or more stations, and a transmitter ID that identifies the transmission apparatus; and
transmitting a WUR frame including a type field and only one ID field which corresponds to a space of one ID and indicates one of the IDs,
wherein the IDs are mutually exclusive in the space of the one ID including an unsigned integer from 0 to 4095, and the only one ID field indicates one or more receivers of the WUR frame, and
wherein the assigned IDs are configurable, the assigned IDs are changed by transmitting a WUR element including the changed IDs.

12. The transmission method according to claim 11, wherein the WUR ID uniquely identifies the station in a Basic Service Set (BSS).

13. The transmission method according to claim 11, wherein the WUR group ID uniquely identifies the group of one or more stations in a Basic Service Set (BSS).

14. The transmission method according to claim 11, comprising:
assigning the transmitter ID to the only one ID field when the WUR frame is a broadcast WUR frame.

15. The transmission method according to claim 11, wherein a value range of the WUR group ID is a subset of consecutive values obtained from the space of the one ID.

16. The transmission method according to claim 11, wherein a portion of the WUR group ID is indicated to the one or more stations during a WUR negotiation procedure.

17. The transmission method according to claim 16, wherein the portion of the WUR group ID comprises a plurality of Least Significant Bits (LSBs) of the WUR group ID.

18. The transmission method according to claim 11, wherein a value range of the WUR group ID is configurable.

19. The transmission method according to claim 18, wherein the value range of the WUR group ID is indicated to the one or more stations.

20. A communication apparatus comprising:
a receiver, which, in operation, receives, from a transmission apparatus, a Wake up Radio (WUR) frame including a type field and only one identifier (ID) field which corresponds to a space of one ID and indicates one of IDs, the IDs including a WUR ID that identifies a station, a WUR group ID that identifies a group of one or more stations, and a transmitter ID that identifies the transmission apparatus wherein the IDs are mutually exclusive in the space of the one ID including an unsigned integer from 0 to 4095, and the only one ID field indicates one or more receivers of the WUR frame; and
circuitry, which, in operation, determines that the WUR frame is intended for the communication apparatus based on the only one ID field,
wherein the IDs are configurable, and the circuitry, in operation, is notified of changed IDs by the receiver receiving a WUR element including the changed IDs.

* * * * *